(12) United States Patent
Kogure et al.

(10) Patent No.: US 11,704,076 B2
(45) Date of Patent: Jul. 18, 2023

(54) IMAGE FORMING APPARATUS EXECUTING FORM PRINTING APPLICATION FOR PRINTING DOCUMENT ON NETWORK, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Takeshi Kogure, Ibaraki (JP); Atsushi Ikeda, Ibaraki (JP); Hiroaki Koike, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/337,663

(22) Filed: Jun. 3, 2021

(65) Prior Publication Data
US 2021/0389913 A1  Dec. 16, 2021

(30) Foreign Application Priority Data
Jun. 15, 2020 (JP) ................................ 2020-103089

(51) Int. Cl.
*G06F 3/12* (2006.01)

(52) U.S. Cl.
CPC ............ *G06F 3/121* (2013.01); *G06F 3/1273* (2013.01); *G06F 3/1285* (2013.01)

(58) Field of Classification Search
CPC combination set(s) only.
See application file for complete search history.

(56) References Cited

U.S. PATENT DOCUMENTS

| 6,829,754 B1* | 12/2004 | Yu ......................... G06F 30/398 |
| | | 707/999.102 |
| 8,958,113 B2* | 2/2015 | Shimizu ................. G06K 15/18 |
| | | 358/1.14 |
| 10,706,026 B1* | 7/2020 | Hansen .................. G06F 16/215 |
| 2001/0049784 A1* | 12/2001 | Nomoto ................. G06K 15/00 |
| | | 713/153 |

(Continued)

FOREIGN PATENT DOCUMENTS

JP 2007199788 A 8/2007

*Primary Examiner* — Helen Zong
(74) *Attorney, Agent, or Firm* — Rossi, Kimms & McDowell LLP

(57) ABSTRACT

An image forming apparatus capable of recording an error that occurs before inputting a job in a job execution history. The image forming apparatus includes a network communication unit, a print unit that prints image data included in an input print job, a job-history recording unit that records a print result by the print unit as a job history, and an application manager that executes an application based on occurrence of a start factor. The application includes an obtainment unit that obtains image data via a network using the network communication unit, a job input unit that inputs a print job of the obtained image data into the image forming apparatus, and an error-recording-job input unit that inputs an error recording job into the image forming apparatus when an error occurs in execution of the application and the job input unit does not input the print job.

8 Claims, 24 Drawing Sheets

(56) References Cited

U.S. PATENT DOCUMENTS

| | | | |
|---|---|---|---|
| 2005/0018242 A1* | 1/2005 | Azami | H04N 1/327 |
| | | | 358/1.15 |
| 2008/0091636 A1* | 4/2008 | Ferlitsch | H04N 1/00037 |
| 2011/0170134 A1* | 7/2011 | Murashima | G06F 11/0733 |
| | | | 358/1.15 |
| 2013/0335778 A1* | 12/2013 | Sugiyama | G06F 3/1274 |
| | | | 358/1.16 |
| 2016/0274846 A1* | 9/2016 | Minegishi | G06F 3/1232 |
| 2017/0160996 A1* | 6/2017 | Ohba | G06F 3/1222 |
| 2018/0007215 A1* | 1/2018 | Zakharov | H04N 1/00832 |
| 2018/0253272 A1* | 9/2018 | Fujii | G06F 3/1234 |
| 2018/0373465 A1* | 12/2018 | Chapman | G06F 3/1229 |
| 2020/0259964 A1* | 8/2020 | Mizuta | G06F 3/1234 |
| 2020/0272394 A1* | 8/2020 | Kubota | G06F 3/122 |
| 2021/0064301 A1* | 3/2021 | Yamaguchi | G06F 3/1259 |
| 2021/0099608 A1* | 4/2021 | Kamihisa | H04N 1/32767 |

* cited by examiner

FIG. 6

| Registration of New Button | | OK | Cancel |
|---|---|---|---|
| Detailed Information about Button | | 602 | 603 |

Basic Setting

- Button Name : 604 — [ Topics ] (Up to 20 Characters)
- File/Folder : ⦿ Specify by Path } 605
  ○ Specify by URL } 606
- Location of File/Folder : [ ] (Up to 256 Characters)
- User Name : [ ] — 607
- ☐ Set/Chang Password
  608 Password : [ ] — 609
- 610 ☒ Display Confirmation Screen before Execution

Print Setting

- Paper Size : [ A4 ▽ ]
- Duplex : ⦿ Duplex
  ○ Simplex
- Color Mode : [ Auto(Color/Auto) ▽ ] — 611
- Number of Copies : [ 1 ] (1~999)
- Feeding Unit : [ Cassette 1 ▽ ]

Schedule Setting

☒ Set Print Schedule
612

| Day | Hour | Min | AM/PM |
|---|---|---|---|
| Sunday : | 1 | 30 | AM ▽ |
| Monday : | 5 | 45 | PM ▽ |
| Wednesday : | | | AM ▽ |
| Thursday : | | | AM ▽ |
| Friday : | | | AM ▽ |
| Saturday : | | | AM ▽ |

613

601

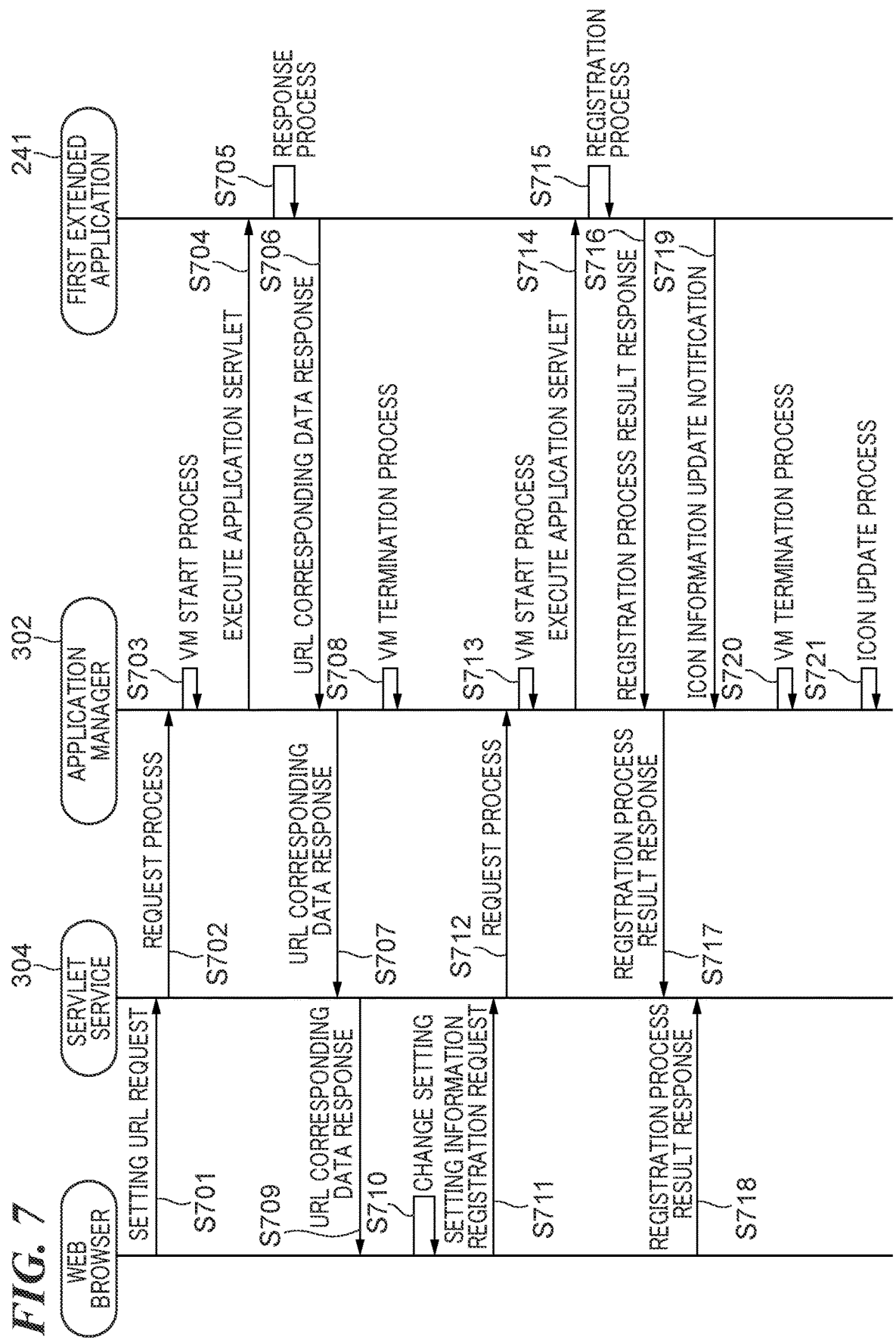

FIG. 8

```
                                                                  801
┌─────────────────────────────────────────────────────────────┐
│                                                             │
│ 802 ──── formName  : Topics                                 │
│ 803 ──── formEnable : true                                  │
│ 804 ──── filePath  : path                                   │
│ 805 ──── path  : ¥smbpath¥print¥                            │
│ 806 ──── username : userA                                   │
│ 807 ──── setPassword : true                                 │
│ 808 ──── password : a_pass                                  │
│ 809 ──── execConfirm : true                                 │
│           ⎧ paperSize : a4                                  │
│           ⎪ duplex : true                                   │
│ 810      ⎨  color : auto                                    │
│           ⎪ copies : 1                                      │
│           ⎩ inputTray : 2                                   │
│ 811 ──── printTime :  {enabel:true,                         │
│                        sun:{mTime:30,hTime:1},              │
│                        mon:{mTime:45,hTime:17},             │
│                        tue:[ ],wed:[ ],thu:[ ],fri:[ ],sat:[ ]} │
└─────────────────────────────────────────────────────────────┘
```

FIG. 20

Print Job History

| Job Number | Execution Result | Number of Pages | Title |
|---|---|---|---|
| 1 | OK | 1 | Test.txt |
| 2 | OK | 2 | Sample.txt |
| 3 | OK | 10 | Score.txt |
| 4 | NG | 0 | Unknown.bin |
| 5 | OK | 1 | Picture.jpg |
| 6 | OK | 1 | Landscape.png |
| 7 | NG | 0 | Form Printing: Topics: The file could not be read... |

IMAGE FORMING APPARATUS EXECUTING FORM PRINTING APPLICATION FOR PRINTING DOCUMENT ON NETWORK, CONTROL METHOD THEREFOR, AND STORAGE MEDIUM STORING CONTROL PROGRAM THEREFOR

BACKGROUND OF THE INVENTION

Field of the Invention

The present invention relates to an image forming apparatus that can execute a form printing application for printing a document on a network, a control method therefor, and a storage medium storing a control program therefor.

Description of the Related Art

There is a known technique that records occurrence of an error, which occurs during execution of a job input to an image forming apparatus, in a job execution history (Japanese Laid-Open Patent Publication (Kokai) No. 2007-199788 (JP 2007-199788A)).

Moreover, there is a known print application that obtains a file on a network and inputs a print job included in the file to an image forming apparatus.

However, the technique of JP 2007-199788A cannot record a job execution history about a job that is not yet input to the image forming apparatus. Accordingly, when the print application cannot input a job to the image forming apparatus because of occurrence of a certain error, the occurrence of the error cannot be recorded in the job execution history.

SUMMARY OF THE INVENTION

The present invention provides an image forming apparatus, a control method therefor, and a storage medium storing a control program therefor thar are capable of recording an error that occurs before inputting a job in a job execution history.

Accordingly, a first aspect of the present invention provides an image forming apparatus including a network communication unit, a print unit configured to print image data included in an input print job, a job-history recording unit configured to record a print result by the print unit as a job history, and an application manager configured to execute an application based on occurrence of a start factor. The application includes an obtainment unit configured to obtain image data via a network using the network communication unit, a job input unit configured to input a print job of the image data obtained by the obtainment unit into the image forming apparatus, and an error-recording-job input unit configured to input an error recording job into the image forming apparatus in a case where an error occurs in execution of the application and where the job input unit does not input the print job.

Accordingly, a second aspect of the present invention provides an image forming apparatus including a network communication unit, a print unit configured to print image data included in an input print job, a job-history recording unit configured to record a print result by the print unit as a job history, and an application manager configured to execute an application in a case where scheduled printing time comes. The application includes an obtainment unit configured to obtain image data via a network using the network communication unit, a job input unit configured to input a print job of the image data obtained by the obtainment unit into the image forming apparatus, and an error report printing unit configured to generate a first error report and to print the first error report using the print unit in a case where an error occurs in execution of the application.

According to the present invention, an error that occurs before inputting a job is recordable in a job execution history.

Further features of the present invention will become apparent from the following description of exemplary embodiments with reference to the attached drawings.

BRIEF DESCRIPTION OF THE DRAWINGS

FIG. 6 is a view showing a setting screen of the extended application that is a form printing application.

FIG. 7 is a sequence chart showing processes of a case of setting the extended application that is the form printing application.

FIG. 8 is a view showing an example of setting data registered by a registration process that the extended application that is the form printing application executes.

FIG. 20 is a view showing a job-history confirmation screen displayed on an operation unit.

DESCRIPTION OF THE EMBODIMENTS

Figure 1:
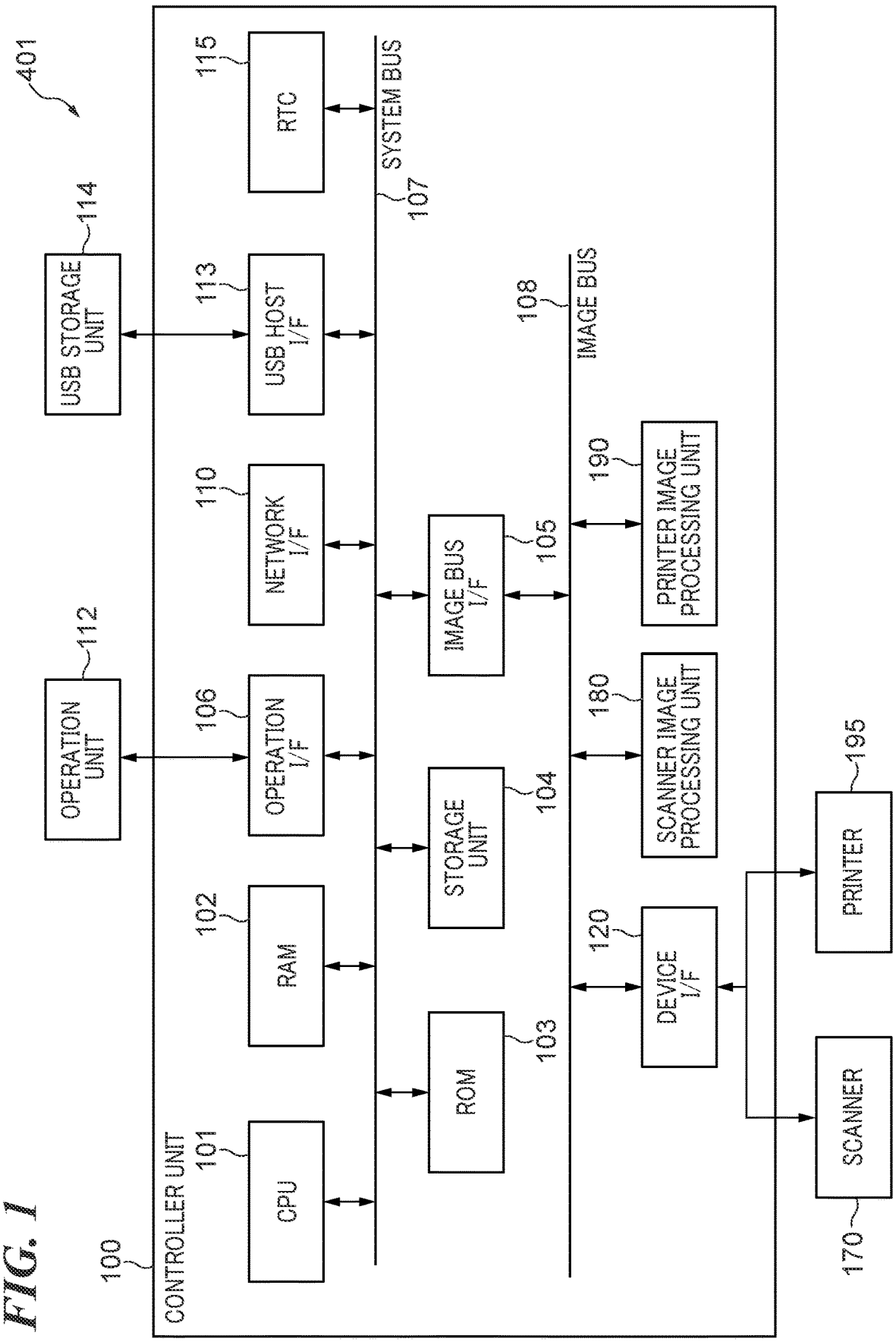
FIG. 1 is a block diagram showing a hardware configuration of a main part of an image forming apparatus according to a first embodiment.

Hereafter, embodiments according to the present invention will be described in detail by referring to the drawings.

FIG. 1 is a block diagram showing a hardware configuration of a main part of an image forming apparatus 401 according to a first embodiment. The image forming apparatus 401 is connected to a print system 400 of FIG. 4 mentioned later.

The image forming apparatus 401 is provided with a controller unit 100, a scanner 170 that is an image input device, an operation unit 112 that has a touch panel, a USB storage unit 114 as an external storage device that stores data, and a printer 195 that is an image output device.

The controller unit 100 connects with the scanner 170, printer 195, operation unit 112, and USB storage unit 114. Moreover, the controller unit 100 controls to achieve a copy function that reads an image by the scanner 170 and prints out data of the image by the printer 195. Moreover, the controller unit 100 controls to achieve a function of a print unit that prints out print data included in a print job input to the image forming apparatus 401 by the printer 195.

The controller unit 100 is provided with a CPU 101, a RAM 102, a ROM 103, a storage unit 104, an image bus I/F 105, an operation I/F 106, a system bus 107, an image bus 108, a network I/F 110, and a USB host I/F 113. Moreover, the controller unit 100 is provided with an RTC 115, a device I/F 120, a scanner image processing unit 180, and a printer image processing unit 190.

The CPU 101 starts an operating system (OS) by a boot program stored in the ROM 103. The CPU 101 runs programs stored in the storage unit 104 on the OS so as to execute various processes in the image forming apparatus 401. The RAM 102 provides a work area of the CPU 101 and an image memory area that stores image data temporarily. The storage unit 104 stores programs, image data, etc.

The ROM 103, RAM 102, operation I/F 106, network I/F 110, USB host I/F 113, and image bus I/F 105 are connected to the CPU 101 through the system bus 107.

The operation I/F 106 is an interface with the operation unit 112. Image data that is displayed on the operation unit 112 is output to the operation unit 112 through the operation I/F 106. Moreover, information entered by a user to the operation unit 112 is sent to the CPU 101 through the operation I/F 106.

Figure 4:
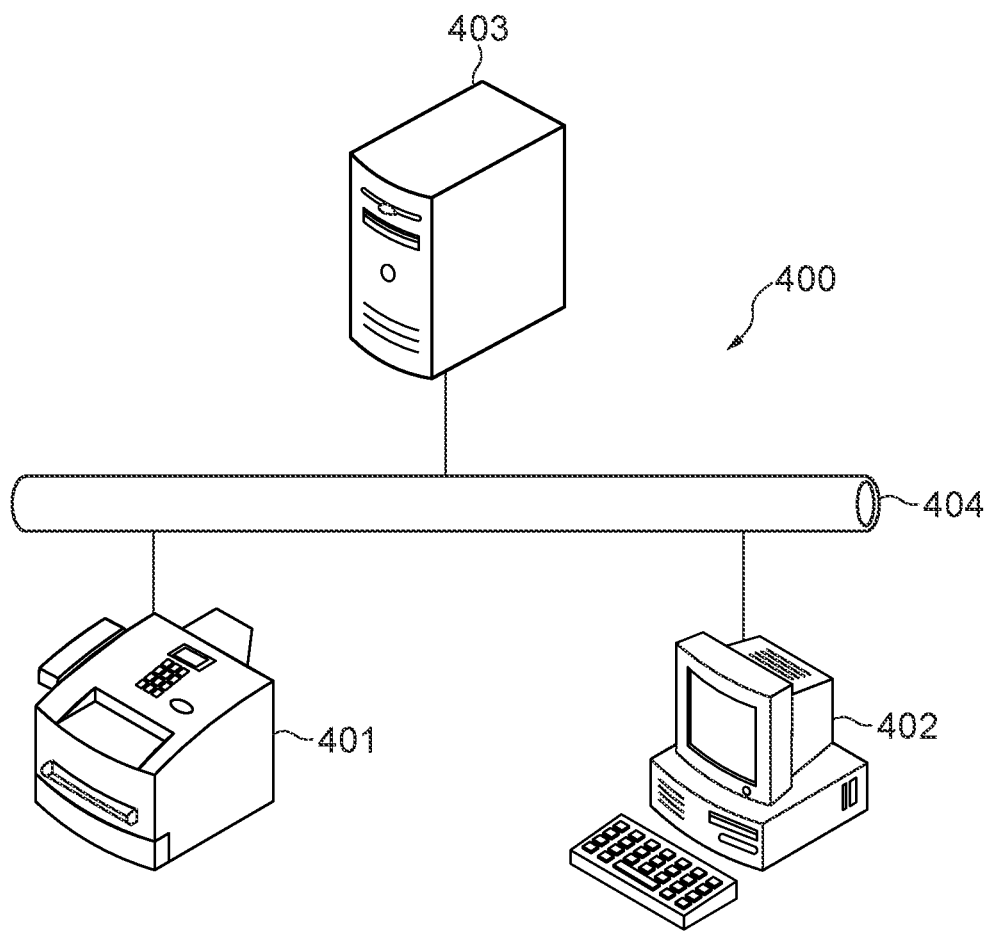
FIG. 4 is a general view showing a print system in the embodiment of the present invention.

The network I/F 110 is an interface for connecting the image forming apparatus 401 to the Ethernet 404 (FIG. 4). The controller unit 100 controls to achieve a network communication unit that obtains data from the server 403 through the network I/F 110.

The USB host I/F 113 is an interface for communicating with the USB storage unit 114. Moreover, the USB host I/F 113 is an output port for storing data stored in the storage unit 104 to the USB storage unit 114. Furthermore, the data stored in the USB storage unit 114 is transferred to the CPU 101 through the USB host I/F 113. The USB host I/F 113 is constituted so that a plurality of USB devices including the USB storage unit 114 are attachable and detachable.

The RTC 115 clocks current time. The time information provided from the RTC 115 is used to record a job input time, etc.

The image bus I/F 105 is a bus bridge for connecting the system bus 107 to the image bus 108 that transfers image data at high speed and for converting a data format.

The image bus 108 is constituted by a PCI bus or the IEEE 1394. On the image bus 108, the device I/F 120, scanner image processing unit 180, and printer image processing unit 190 are provided.

The scanner 170 and printer 195 are connected to the device I/F 120. The device I/F 120 converts image data between a synchronizing system and an asynchronous system.

The scanner image processing unit 180 corrects, processes, and edits the image data input from the scanner 170 through the device I/F 120.

The printer image processing unit 190 corrects the image data output to the printer 195 through the device I/F 120 to convert resolution according to a characteristic of the printer 195.

Figure 2:
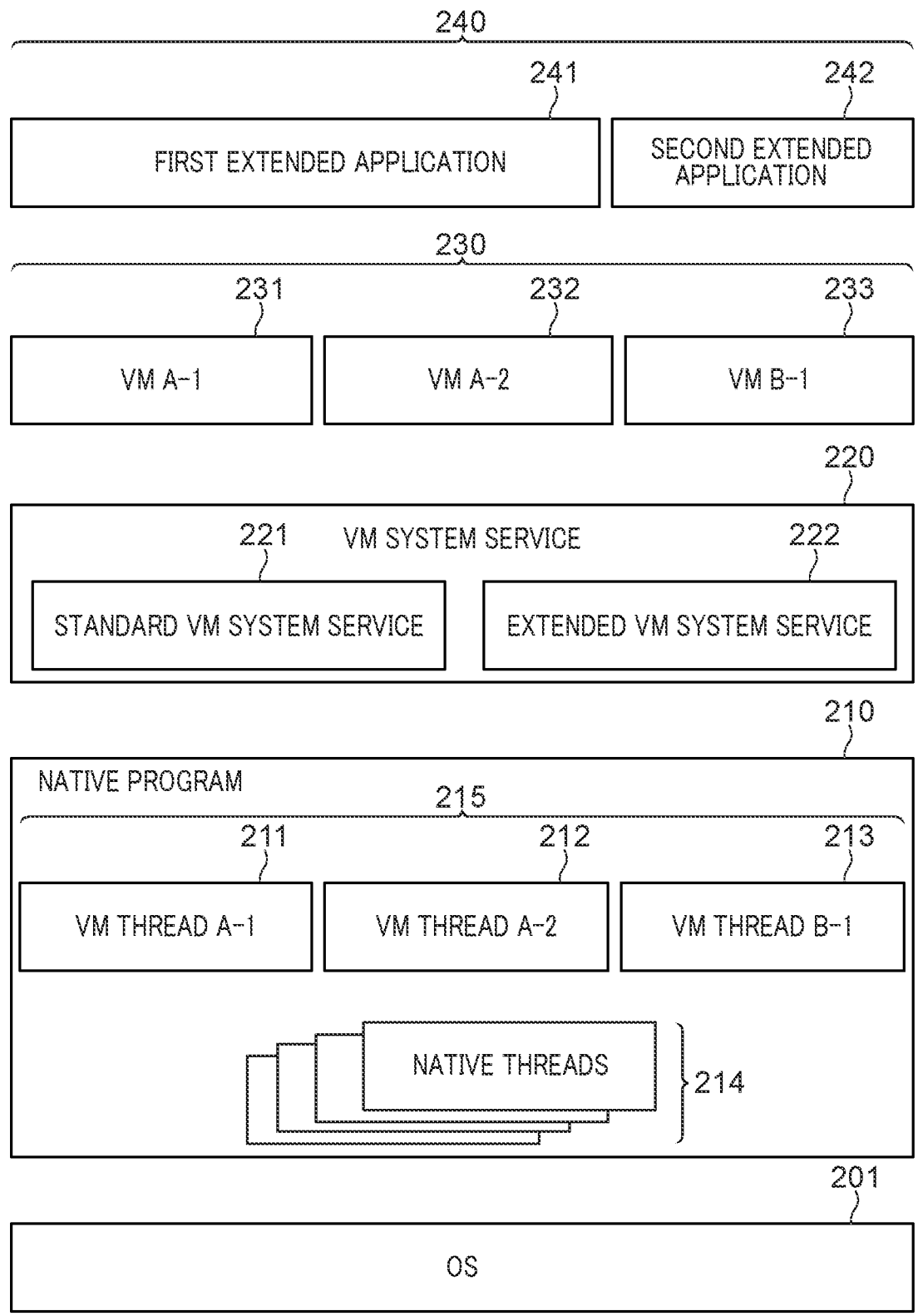
FIG. 2 is a view showing a software configuration of the image forming apparatus.

FIG. 2 is a view showing a software configuration of the image forming apparatus 401. The CPU 101 loads a program stored in the storage unit 104 to the RAM 102 and executes the program on the software shown in FIG. 2, so that modules shown in FIG. 3 mentioned later are achieved in the image forming apparatus 401.

As shown in FIG. 2, the image forming apparatus 401 has an OS (Operating System) 201, a native program 210, a VM system service 220, a virtual machine (VM) 230, and an extended application 240.

The native program 210 and the VM 230 run on the OS 201. The native program 210 controls the image processing units, such as the printer 195 and the scanner 170.

The VM 230 is an execution environment of the extended application 240. That is, the VM 230 is a module that understands and executes a program that controls the extended application 240. The extended application 240 certainly operates on the VM 230. The program runs on the VM 230 by a dedicated command for the VM 230 that is different from a command for the CPU 101. The dedicated command for the VM 230 is called a byte code. In the meantime, the dedicated command for the CPU 101 is called a native code. The native code and the byte code for the VM 230 operate because the VM 230 successively interprets and processes the byte code. A VM of a first type successively interprets and processes the byte code as-is. A VM of a second type converts the byte code into the native code and executes. Although the VM 230 of this embodiment belongs to the first type, it may belong to the second type. In general, commands running on CPUs of different types are incompatible. Similarly, commands running on VMs of different types are incompatible. Moreover, although the VM 230 of this embodiment is a software module that operates on the CPU 101, it may be a hardware module.

The native program 210 includes native threads 214 for controlling the image processing units, such as the printer 195 and the scanner 170, and a VM thread 215 for operating the VM 230. The VM thread 215 is general term of VM threads of which the number is equal to the number of the VMs. In this embodiment, three VM threads including a VM thread A-1 211, VM thread A-2 212, and VM thread B-1 213 are generated.

The VM system service 220 is a utility library that is used by the extended application 240 in common. Access to each module of the image forming apparatus 401 is available by calling a function of the VM system service 220 from the extended application 240. Thereby, the time and effort for developing the extended application 240 can be saved. The VM system service 220 includes a standard VM system service 221 that enables the minimum operation of the VM 230 and an extended VM system service 222 that accesses each module of the image forming apparatus 401 and provides the function of the OS 201. The standard VM system service 221 also includes a function to load the extended applications 240. When the VM 230 executes an API instructed by a byte code in the extended application 240, the VM system service 221 or 222 associated with the API is called.

The VM 230 is a general term of VMs that execute the extended application 240. The VM 230 is generated for every thread of the extended application 240. In this embodiment, three VMs including a VM A-1 231, VM A-2 232, and VM B-1 233 are generated. Moreover, the extended application 240 is a general term of a plurality of extended applications and includes a first extended application 241 and second extended application 242 in this embodiment. That is, the VM A-1 231 and the VM A-2 232 respectively operate the VM thread A-1 211 and the VM thread A-2 212 in the first extended application 241. Moreover, the VM B-1 233 operates the VM thread B-1 213 in the second extended application 242.

Moreover, icons for respectively activating the first extended application 241 and the second extended application 242 are displayed on a main menu screen displayed on the operation unit 112 of the image forming apparatus 401. For example, when the operation I/F 106 detects what a user selects the icon for activating the first extended application 241 through the operation unit 112, the operation I/F 106 transmits the gist of that to the CPU 101. The CPU 101 that receives the gist activates the first extended application 241.

Figure 3:
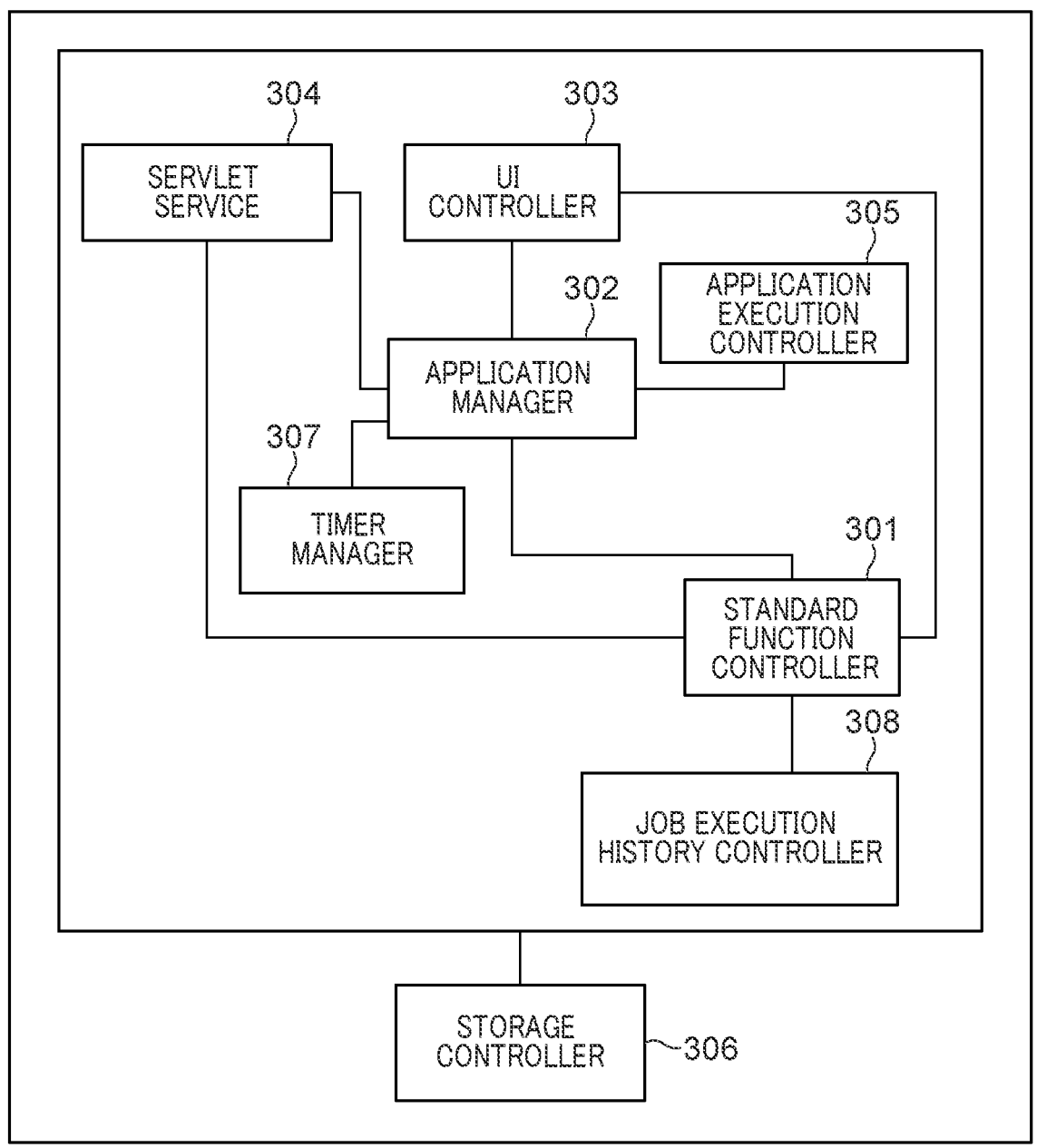
FIG. 3 is a block diagram showing software modules of the image forming apparatus.

FIG. 3 is a block diagram showing software modules that run on the CPU 101 of the image forming apparatus 401 of this embodiment. The software modules of this embodiment includes eight modules. Specifically, they are a standard function controller 301, an application manager 302, a UI controller 303, a servlet service 304, an application execution controller 305, a storage controller 306, a timer manager 307, and a job-execution-history controller 308.

When receiving an access request to a specific URL by HTTP through the network I/F 110, the servlet service 304 distributes a process to the application manager 302 or the standard function controller 301 in accordance with the URL.

The UI controller 303 displays a screen on the operation unit 112, receives an operation from a user, and notifies a suitable module among the application manager 302 and the standard function controller 301 of the operation information.

The application manager 302 manages installation, activation, etc. of the extended application 240.

The application execution controller 305 controls the execution of the extended application 240 activated by the application manager 302. Specifically, the VM thread 215, VM system service 220, VM 230, and extended application 240 are controlled.

The storage controller 306 records and manages the program of the extended application 240 and the setting information. The application execution controller 305 accesses the storage controller 306 and reads the program of the extended application 240. Moreover, each module accesses the storage controller 306 to refer and to set a set value.

The standard function controller 301 performs controls of execution of copy and FAX that are standard functions of the image forming apparatus 401 and performs another control required for the image forming apparatus 401 (control of the USB host I/F 113, for example). Moreover, the standard function controller 301 manages copy, FAX, etc. that are executed by the image forming apparatus 401 as jobs and requests the job-execution-history control module 308 to record execution results of the jobs.

The job-execution-history controller 308 (job-history recording unit) requests the storage controller 306 to record a job history in order to keep the execution results of the jobs as the job history in the storage unit 104.

The timer manager 307 obtains current time information from the RTC 115, detects that prescribed time elapsed, and notifies the application manager 302. When receiving the notification from the timer manager 307, the application manager 302 starts the extended application 240 and requests the application execution controller 305 to execute the timer process of the extended application 240. In response to this request, the application execution controller 305 instructs the extended application 240 to execute the timer process.

FIG. 4 is a general view showing the print system 400 including the image forming apparatus 401. The extended application 240 is installed into the image forming apparatus 401 in a state where the image forming apparatus 401 is connected to the print system 400.

The print system 400 includes the image forming apparatus 401, host PC 402, and server 403 that are mutually connected through the Ethernet 404.

The image forming apparatus 401 supplies installation means of the extended application 240 to the host PC 402 through the Ethernet 404. The host PC 402 has installation data of the extended application 240 and installs the extended application 240 to the image forming apparatus 401 using the installation means of the extended application 240 that the image forming apparatus 401 supplies.

The server 403 has image data to be printed and transmits the image data to the image forming apparatus 401 in response to an image data obtainment request from the image forming apparatus 401.

Figure 5:
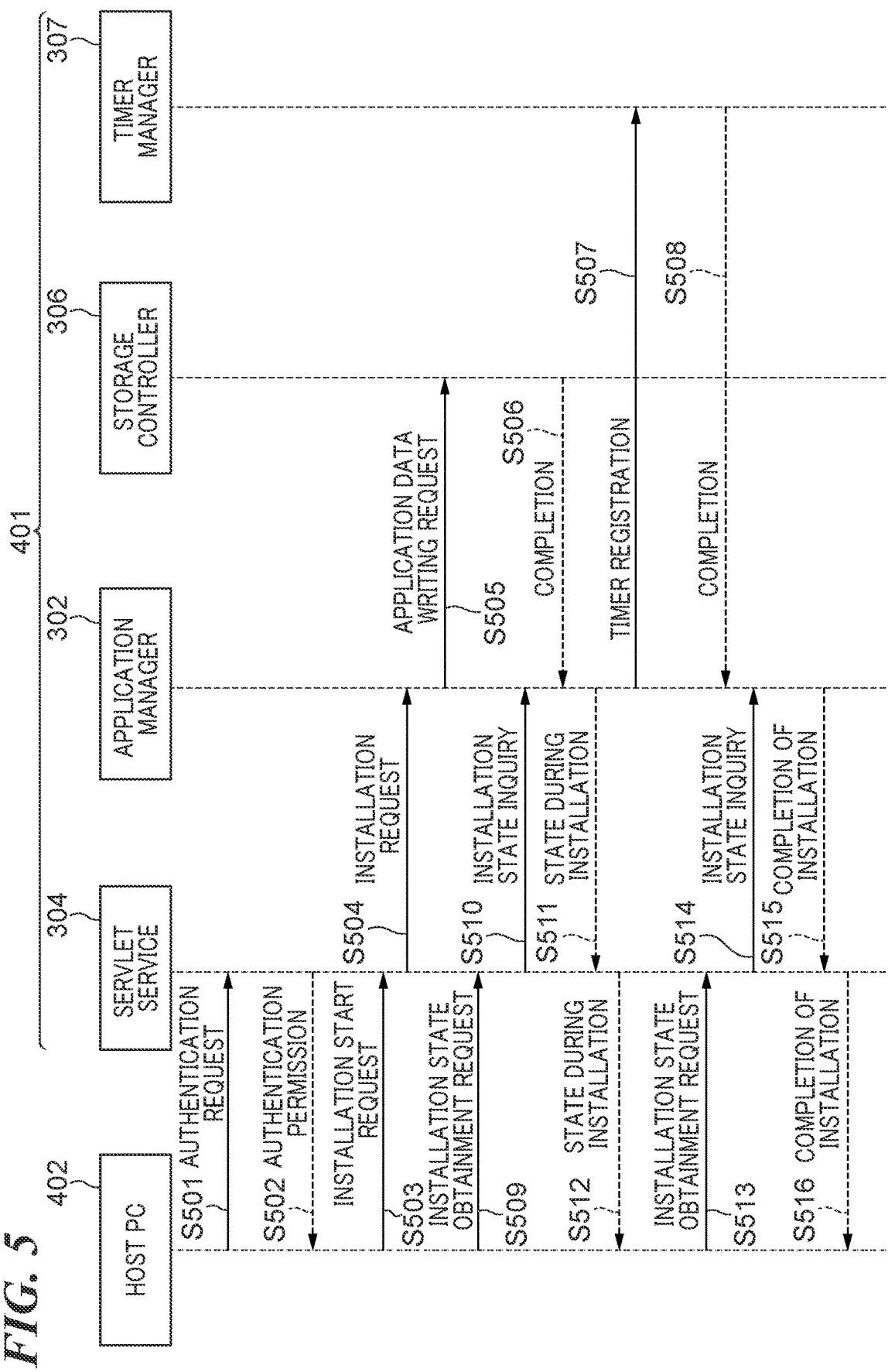
FIG. 5 is a sequence chart showing processes of a case where an extended application in FIG. 2 is installed to the image forming apparatus from a host PC in FIG. 4.

FIG. 5 is a sequence chart showing processes of a case where the extended application 240 is installed to the image forming apparatus from the host PC 402.

In this sequence, the processes in the application manager 302, servlet service 304, storage controller 306, and timer manager 307 are executed by the CPU 101 in accordance with the program stored in the storage unit 104. Moreover, a CPU (not shown) in the host PC 402 similarly executes the process in the host PC 402 in the sequence of FIG. 5 in accordance with a program stored in the storage unit (not shown) in the host PC 402. However, the execution subjects of the steps shall be the application manager 302, servlet service 304, storage controller 306, timer manager 307, and host PC 402 in the following description.

First, in a step S501, the host PC 402 sends an authentication request in order to install the extended application 240 into the image forming apparatus 401. At this time, the image forming apparatus 401 is notified of information (a user ID, a password) required for the authentication.

When receiving the authentication request, the servlet service 304 checks the authentication information and returns an authentication permission in a step S502 when the authentication information has no problem. At this time, a character string (token) that shows the authentication permission is returned together.

The host PC that obtains the authentication permission notifies the image forming apparatus 401 of an installation start request in a step S503. At this time, the installation data (hereinafter referred to as application data 1001) of the extended application 240 that the host PC 402 has and the token obtained in the step 502 are reported. It should be noted that a configuration of the application data 1001 will be mentioned later by referring to FIG. 10.

The servlet service 304 that receives the installation start request in the step S503 checks whether the token is correct. And when the token is correct, the servlet service 304 requests the application manager 302 to install the extended application 240 in a step S504.

When receiving the installation request, the application manager 302 sends an application data writing request to the storage controller 306 in a step S505. When receiving the application data writing request, the storage controller 306 starts writing the application data 1001 to the storage unit 104.

When the writing of the application data 1001 started in response to the application data writing request of the step S505 is completed, the storage controller 306 notifies the application manager 302 of completion in a step S506.

The application manager 302 registers timer information included in the installed application data 1001 into the timer manager 307 in a step S507.

In a step S508, the timer manager 307 notifies the application manager 302 of completion of the registration of the timer information. The timer information is mentioned later.

In a step S509, the host PC 402 notifies the image forming apparatus 401 of an installation state obtainment request to check an installation state. At this time, the image forming apparatus 401 is notified of the token obtained in the step S502.

At step S509, the servlet service 304 that received the installation state obtainment request in the step S509 checks whether the notified token is correct. As a result, when the token has no problem, the servlet service 304 checks the installation state by inquiring of the application manager 302 the installation state in a step S510.

When receiving the installation state inquiry, the application manager 302 returns a current installation state in a step S511. In this embodiment, since the installation state in this time point is under installation, the application manager 302 returns a state during installation as the current installation state.

In a step S512, the servlet service 304 notifies the host PC 402 of the current installation state obtained from the application manager 302. In this embodiment, since the installation state in this time point is under installation, the servlet service 304 notifies the host PC 402 of the state during installation as the current installation state.

The host PC 402 repeats the installation state obtainment request to the servlet service 304 until a notification of completion of installation comes from the servlet service 304. In this embodiment, the host PC 402 is notified of the completion of installation from the servlet service 304 in a step S516 in response to the second installation state obtainment request by the host PC 402 in the step S513.

In this embodiment, the data of the extended application 240 that the host PC 402 has is installed in the image forming apparatus 401 in accordance with the above process. Moreover, when the installation is completed, the icons for respectively activating the first extended application 241 and the second extended application 242 are displayed on the main menu screen displayed on the operation unit 112 of the image forming apparatus 401.

Next, a setting screen 601 for the first extended application 241 displayed when a user clicks the icon for activating the first extended application 241 displayed on the main menu screen of the operation unit 112 of the image forming apparatus 401 will be described.

It should be noted that the first extended application 241 is a form printing application that prints a form image data that the user registered.

FIG. 6 is a view showing the setting screen 601 for the first extended application 241 that is the form printing application. The setting screen 601 is displayed on a Web browser that runs on the host PC 402 connected with the image forming apparatus 401 through the Ethernet 404.

The setting screen 601 includes a button name entry field 604, file/folder specification field 605, place information entry field 606, user name entry field 607, check box 608, password entry field 609, and selection check box 610 in a basic setting section.

The button name entry field 604 set on the setting screen 601 of FIG. 6 is a text box into which the user enters a name (button name) of the form printing executed by the first extended application 241. The button name ("Topics" in the example shown in FIG. 6) entered into the button name entry field 604 is set as the button name of the icon displayed on the main menu screen of the operation unit 112 of the image forming apparatus 401. When the user clicks the icon whose button name is "Topics" on the main menu screen, the form printing by the first extended application 241 is executed with setting contents associated with the icon.

The file/folder specification field 605 has two radio buttons that urge the user to select a method to specify a place of a print target file between a method by designating a URL that specifies a place of the file and a method designating a path of a folder storing the file.

The place information entry field 606 is a text box into which the user enters information (i.e., a URL or a path) about the place of the print target file by the method designated by the file/folder specification field 605.

The user name entry field 607 is a text box into which the user enters a user name required for accessing the file or the folder storing the file that is entered into the place information entry field 606.

The check box 608 is used to select whether to enable set/change of a password.

The password entry field 609 is a text box into which the user enters the password required for accessing the file or the folder storing the file that is entered into the place information entry field 606 when the check box 608 is checked.

The selection check box 610 is used to select whether to display an execution confirmation screen before executing the form printing with setting contents associated with the icon when the user presses the icon whose button name is "topics" on the main menu screen of the operation unit 112.

Furthermore, the setting screen 601 includes a print setting section including fields 611 and a schedule setting section including a check box 612 and fields 613. The fields 611 are used to designate a sheet size, two sided, a color mode, the number of copies, and a sheet cassette. The check box 612 is used to select whether to validate a print schedule setting. The fields 613 are used to designate time of each day of a week to print.

Moreover, the setting screen 601 includes an OK button 602 and a Cancel button 603. When the OK button 602 is pressed, the setting screen 601 will close and the icon of which the button name is "Topics" will be displayed on the main menu screen of the operation unit 112 of the image forming apparatus 401. The icon is associated with the setting contents that the user sets on the setting screen 601. When the Cancel button 603 is pressed, the contents set on the setting screen 601 will be canceled, and the setting screen 601 will be closed.

FIG. 7 is a sequence chart showing processes of a case of setting the extended application 240 that is the form printing application. Specifically, FIG. 7 shows a flow that generates icon information associated with the setting contents set by the user to the first extended application 241 that is a form printing application. In addition, although detailed process contents at the time of setting differ from the process contents shown in FIG. 7 in accordance with the type of the extended application 240, a fundamental process is common.

It should be noted that processes by the application manager 302, servlet service 304, and first extended application 241 in the sequence of FIG. 7 are executed by the CPU 101 of the image forming apparatus 401 in accordance with the program stored in the storage unit 104. Moreover, the CPU (not shown) in the host PC 402 similarly executes the process in the Web browser in the sequence of FIG. 7 in accordance with a program stored in the storage unit (not shown) in the host PC 402. However, the execution subjects of the respective steps shall be the application manager 302, servlet service 304, first extended application 241, and Web browser in the following description.

When the user clicks the icon to activate the first extended application 241 displayed on the main menu screen of the operation unit 112 of the image forming apparatus 401, this sequence starts.

The Web browser first sends an obtainment request (a setting URL request) that requests a setting URL that holds the information for setting the first extended application 241 and the information held at the setting URL from the servlet service 304 (a step S701).

When receiving the setting URL request, the servlet service 304 requests the application manager 302 to process the setting URL request (a step S702).

The application manager 302 that is requested to process the setting URL request specifies that the target application is the first extended application 241 on the basis of the setting URL. After that, the application manager 302 performs a VM start process for the VMs (i.e., the VM A-1 231 and VM A-2 232) of the first extended application 241 (a step S703).

Next, the application manager 302 executes an application servlet of the first extended application 241 (a step S704). At this time, the application manager 302 notifies the first extended application 241 of the setting URL and the setting URL request that are sent from the Web browser.

The first extended application 241 performs a response process to the setting URL request sent from the application manager 302 (step S705). In this step, the first extended application 241 prepares for returning an HTML resource to the setting URL. In this HTML resource, an HTML form to refer and to set the information shown in FIG. 8 required for a form printing process is described.

Next, the first extended application 241 sends the prepared HTML resource (a URL corresponding data response) to the application manager 302 (step S706).

The application manager 302 transfers the response from the first extended application 241 to the servlet service 304 as-is (a step S707) and performs a VM termination process continuously (a step S708).

The servlet service 304 transfers the response received from the application manager 302 to the WEB browser as-is (a step S709).

The Web browser displays the setting screen 601 of FIG. 6 on the basis of the response from the servlet service 304. The user edits the settings using the setting screen 601 displayed on the Web browser to change the setting contents of the first extended application 241 and presses the OK button 602 (a step S710). Hereinafter, a case where the setting contents of the first extended application 241 correspond to a newly registered printing form will be described.

The Web browser sends a setting information registration request including the setting contents of the first extended application 241 changed in the step S710 to the servlet service 304 (step S711).

When receiving the setting information registration request, the servlet service 304 requests the application manager 302 to process the setting information registration request (a step S712).

The application manager 302 that is requested to process the setting information registration request specifies that the target application is the first extended application 241 on the basis of the setting URL as with the step S703. After that, the application manager 302 performs the VM start process for the VMs (i.e., the VM A-1 231 and VM A-2 232) of the first extended application 241 (a step S713).

Next, the application manager 302 executes the application servlet of the first extended application 241 (a step S714) as with the step S704.

The first extended application 241 processes the setting URL request from the Web browser and performs a registration process that registers setting data 801 in FIG. 8 (a step S715). After that, the first extended application 241 sends a registration processing result response to the application manager 302 (step S716).

The application manager 302 transfers the response from the first extended application 241 to the servlet service 304 as-is (a step S717).

The servlet service 304 transfers the response received from the application manager 302 to the WEB browser as-is (a step S718).

The first extended application 241 sends an icon information update notification to the application manager 302 (a step S719) in order to register an icon that is associated with the new printing form registered by the registration process of the step S715.

When receiving the icon information update notification from the first extended application 241, the application manager 302 executes the VM termination process (a step S720) and next performs an icon update process (a step S721).

FIG. 8 is a view showing an example of setting data registered by the registration process of the step S715 in FIG. 7 that the first extended application 241 that is the form printing application executes. The setting data 801 shown in FIG. 8 is an example of the setting data registered by the registration process of the step S715 in FIG. 7, and the setting data is not limited to this.

The setting data 801 is registered (i.e., is written into the storage unit 104) by the first extended application 241 in response to the setting information registration request (the step S711) that the Web browser requests when the OK button 602 is pressed on the setting screen 601.

The setting data 801 consists of nine items 802 through 811. The item 802 shows the button name entered into the button name entry field 604 on the setting screen 601.

The item 803 shows the setting to select whether to validate the setting (whether to display an icon on the operation unit 112 of the image forming apparatus 401). In this embodiment, the default setting of the item 803 is valid (true). It should be noted that the setting of the item 803 cannot be changed by a user and can be changed by an administrator only. Moreover, when the item 803 is invalid, the basic setting section on the setting screen 601 of FIG. 6 is displayed in gray and a user input (selection) becomes impossible. Moreover, neither the icon information update notification of the step S719 in FIG. 7 nor the icon update process of the step S721 performed in response to this notification are executed. Moreover, when the application manager 302 determines that the item 803 is invalid when receiving the registration processing result response in the step S716, the application manager 302 performs the VM termination process of the step S720 without waiting for the icon information update notification of the step S719.

The item 804 shows the setting of whether the information about the file/folder set in the file/folder specification field 605 on the setting screen 601 is designated by a path or a URL.

The item 805 shows the place information about the file/folder set in the place information entry field 606 on the setting screen 601 (hereinafter referred to as "path information").

The item 806 shows the user name that is required for accessing the file/folder set in the user name entry field 607 on the setting screen 601.

The item 807 shows the setting of whether to set/change the password set in the check box 608 on the setting screen 601.

The item 808 shows the password set in the password entry field 609 on the setting screen 601.

The item 809 shows the setting of whether to display the pre-execution confirmation screen set in the selection check box 610 on the setting screen 601.

The items 810 show the settings of the sheet size, two sided, color mode, number of copies, and sheet cassette that are set in the fields 611 on the setting screen 601.

The item 811 shows the setting of whether to set the schedule set in the check box 612 on the setting screen 601 and the schedule setting set in the fields 613 on the setting screen 601. In this example, the setting of whether to set the schedule is "true", i.e., the schedule is set. Moreover, the schedule is set at AM 1:30 on Sunday and PM 5:45 on Monday.

Figure 9:
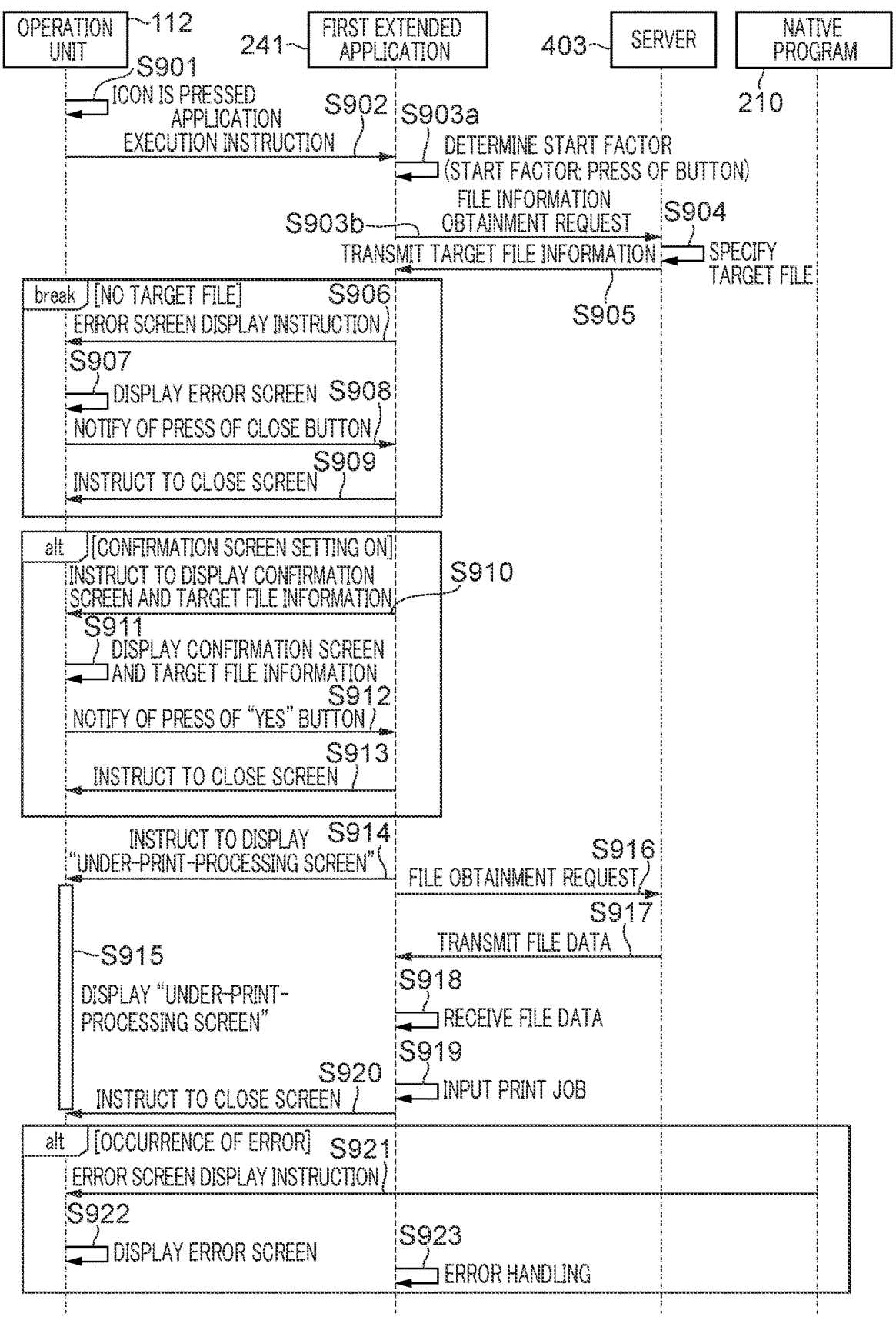
FIG. 9 is a sequence chart showing a form printing process executed in response to a press of a button.

FIG. 9 is a sequence of the form printing process executed in response to a press of the icon (a button press) of which the button name is "Topics" on the main menu screen of the operation unit 112.

It should be noted that processes by the operation unit 112 and first extended application 241 in the sequence of FIG. 9 are executed by the CPU 101 of the image forming apparatus 401 in accordance with the program stored in the storage unit 104. Moreover, a CPU (not shown) in the server 403 similarly executes the process in the server 403 in the sequence of FIG. 9 in accordance with a program stored in a storage unit (not shown) in the server 403. However, the execution subjects of the respective steps shall be the operation unit 112, first extended application 241, and server 403 in the following description.

When the icon of which the button name is "Topics" is pressed (a step S901), the operation unit 112 sends an application execution instruction to the first extended application 241 (a step S902).

When receiving the application execution instruction from the operation unit 112, the first extended application 241 starts in a step S903a. After the starting, it is determined whether a start factor is the button press or the schedule. Since the first extended application 241 starts in response to the application execution instruction from the operation unit 112 in this example, it is determined that the start factor is the button press, and the process proceeds to a step S903b. It should be noted that a case where it is determined that the start factor is the schedule will be mentioned later by referring to FIG. 15.

Next, the first extended application 241 that determines that the start factor is the button press obtains path information that is associated with the icon of which the button name is "topics". After that, the first extended application 241 sends a file information obtainment request to the server 403 on the basis of the obtained path information (the step S903b).

When receiving the file information obtainment request from the first extended application 241, the server 403 specifies one or more target files from among files in the server 403 (a step S904). When the path information is the URL that designates a file, the target file is the file designated by the URL. When the path information is the path that designates the folder, one or more files included in the folder designated by the path become the target files.

Next, the server 403 generates information (hereinafter referred to as "target file information") that shows the specification result of the one or more target files specified in the step S904 and transmits it to the first extended application 241 (a step S905). When the one or more target files are specified in the step S904, information including the number, names, and path information about the one or more target files is generated as the target file information. It should be noted that the target file information showing the specification result showing that there is no target file may be generated. Specifically, when the URL or the path of the path information does not exist, or when there is no file in the folder designated by the path as the path information, the specification result shows that there is no target file. Moreover, when the target file information is not transmitted from the server 403 until a predetermined time period elapses from the obtainment request of the step S903b, the process directly proceeds to a step S923 mentioned later.

When the target file information obtained from the server 403 shows the specification result showing that there is no target file, the first extended application 241 instructs the operation unit 112 to display an error screen (a step S906).

When receiving the error screen display instruction from the first extended application 241, the operation unit 112 displays the error screen 1200 (a step S907).

Figure 12:
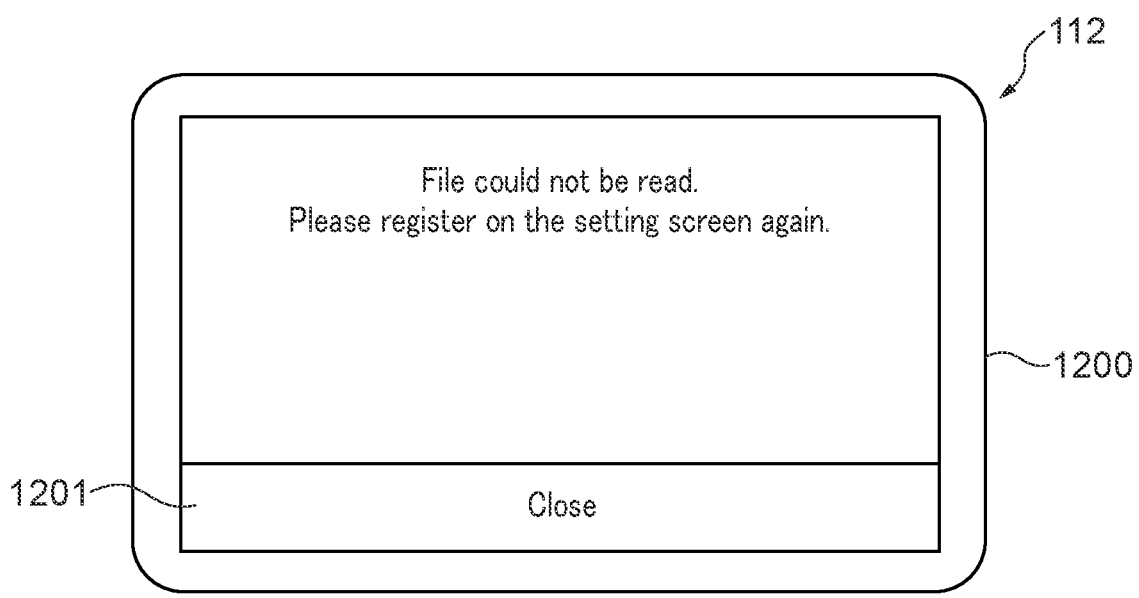
FIG. 12 is a view that exemplifies an error screen displayed in a step S907 in FIG. 9.

As exemplified in FIG. 12, a message showing failure of obtainment of a file and a close button 1201 are displayed on the error screen 1200.

When the closed button 1201 on the error screen 1200 displayed in the step S907 is pressed, the operation unit 112 notifies the first extended application 241 of the press of the close button 1201 (a step S908).

When the first extended application 241 is notified of the press of the close button 1201 from the operation unit 112, the extended application 240 instructs the operation unit 112 to close the error screen 1200 (a step S909) and finishes the process.

In the meantime, when the target file information obtained from the server 403 includes the number, names, and path information about the one or more target files, the first extended application 241 instructs the operation unit 112 to display a confirmation screen and the target file information (a step S910).

When receiving the display instruction of the confirmation screen and target file information from the first extended application 241, the operation unit 112 displays the confirmation screen 1300 including the print setting set on the setting screen 601 and the target file information (a step S911).

Figure 13:
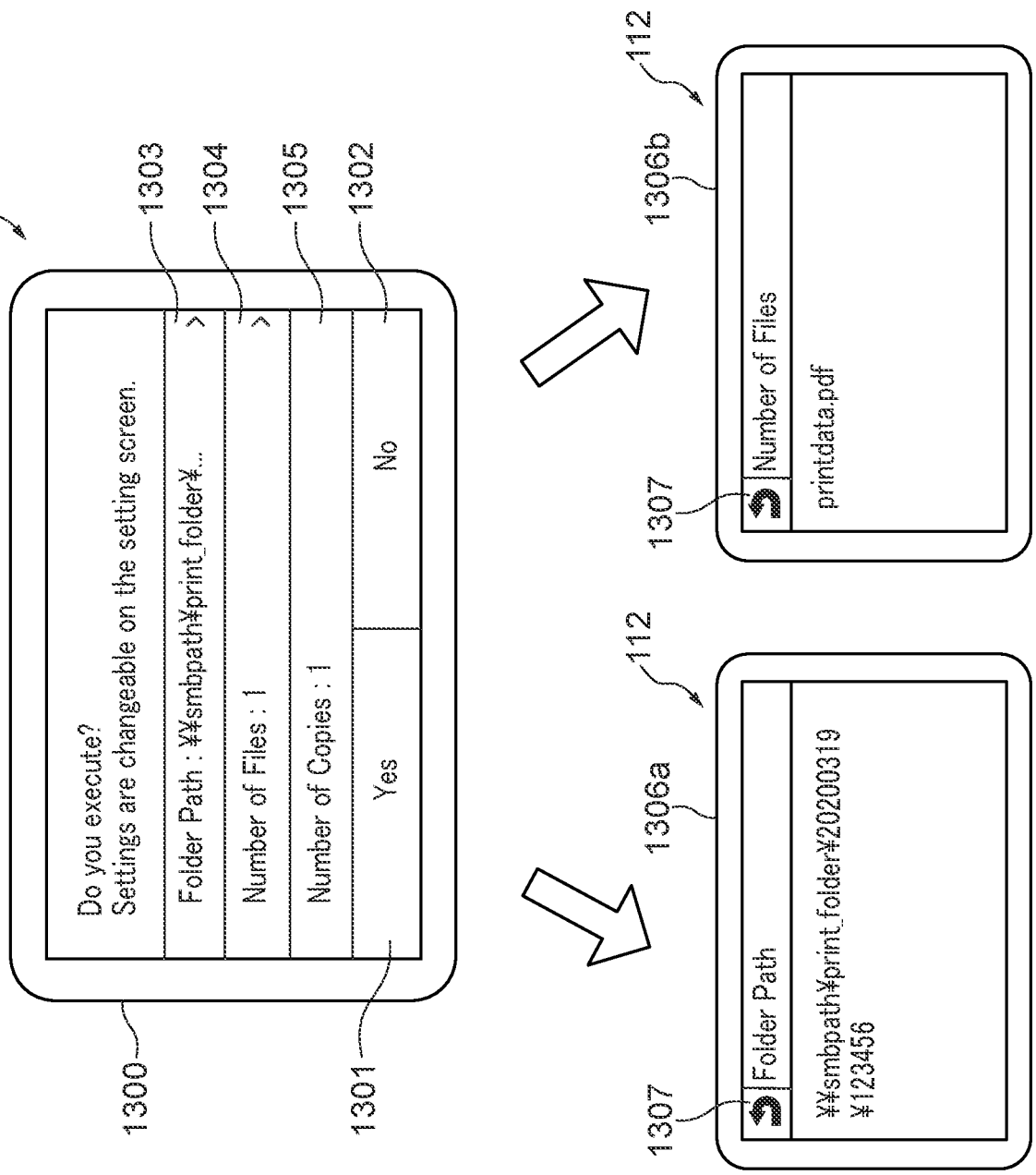
FIG. 13 is a view that exemplifies confirmation screens displayed in a step S911 in FIG. 9.

As exemplified in FIG. 13, the confirmation screen 1300 includes a message that confirms whether print is executed, a "Yes" button 1301, and a "No" button 1302. Moreover, the confirmation screen 1300 includes a button 1303 that displays at least a part of the folder path in which the one or more target files are stored, a button 1304 that displays the number of target files, and a button 1305 that displays the number of copies that is one of the print setting items set on the setting screen 601. It should be noted that buttons displaying setting information about other items of the print setting set on the setting screen 601 may be displayed in the confirmation screen 1300.

When the button 1303 is pressed, a screen 1306a that shows the detailed information about the folder path in which the one or more target files are stored is displayed. When the button 1304 is pressed, a screen 1306b that shows a list of the names of the one or more target files obtained in the step S905 is displayed. A back button 1307 is provided in each of the screens 1306a and 1306b. When the back button 1307 is pressed, the screen display returns to the confirmation screen 1300.

When the "Yes" button 1301 on the confirmation screen 1300 displayed in the step S911 is pressed, the operation unit 112 notifies the first extended application 241 of the press of the "Yes" button (a step S912).

When receiving such a notification, the first extended application 241 instructs the operation unit 112 to close the confirmation screen (a step S913).

Next, the first extended application 241 instructs the operation unit 112 to display an under-print-processing screen (a step S914).

When receiving the display instruction of the under-print-processing screen from the first extended application 241, the operation unit 112 starts displaying the under-print-processing screen 1400 (a step S915).

Figure 14:
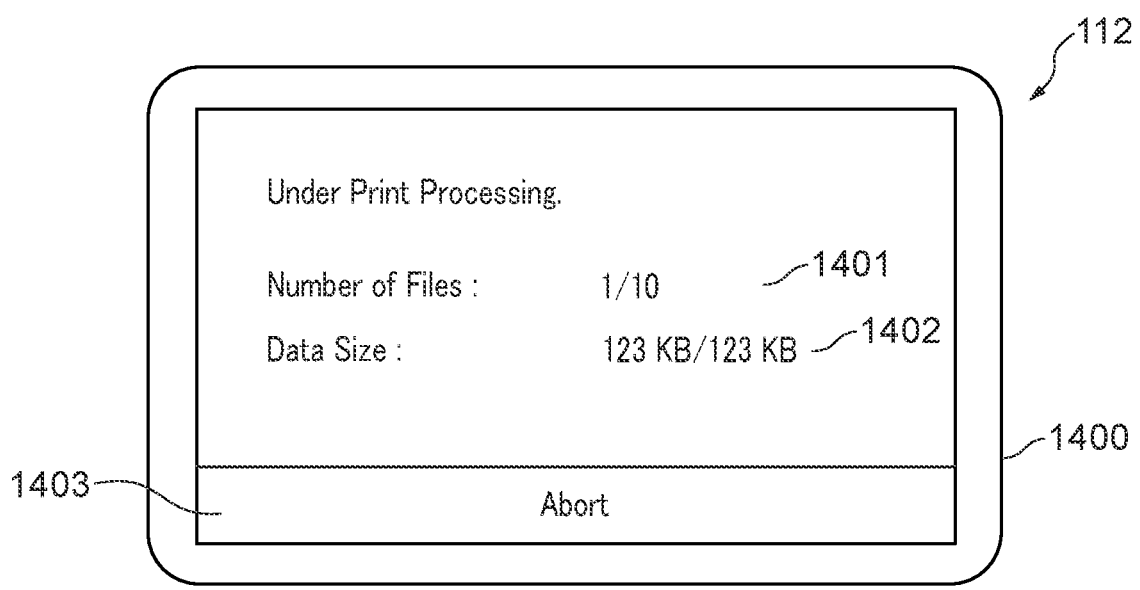
FIG. 14 is a view that exemplifies an under-print-processing screen displayed in a step S915 in FIG. 9.

As exemplified in FIG. 14, a message showing that the print process is under execution and an abort button 1403 for aborting the print process are displayed on the under-print-processing screen 1400. Moreover, an item 1401 that displays the number of target files and the number of processed files, and an item 1402 that displays a data amount of a file under process and an amount of data that has been input into a print job are also displayed on the under-print-processing screen 1400.

The first extended application 241 sends a file obtainment request to the server 403 (a step S916) after instructing the operation unit 112 to display the under-print-processing screen 1400 in the step S914. This file obtainment request includes the number, names, and path information about the one or more target files.

When receiving the file obtainment request from the first extended application 241, the server 403 transmits the file data of the one or more target files to the first extended application 241 (a step S917).

When receiving all the file data of the one or more target files transmitted from the server 403 (a step S918), the first extended application 241 inputs the print job of all the received file data (a step S919). The step S918 corresponds to a function of a file obtainment unit (file obtainment step) that obtains the file on the network. Moreover, the step S919 corresponds to a function of a job input unit (job input step) that inputs a print job into the image forming apparatus 401.

After completing the input of the print job in the step S919, the first extended application 241 instructs the operation unit 112 so as to close the under-print-processing screen 1400 (a step S920) and finishes the process.

The operation unit 112 finishes the display of the under-print-processing screen 1400 started in the step S915 in response to the instruction in the step S920 from the first extended application 241.

Figure 19:
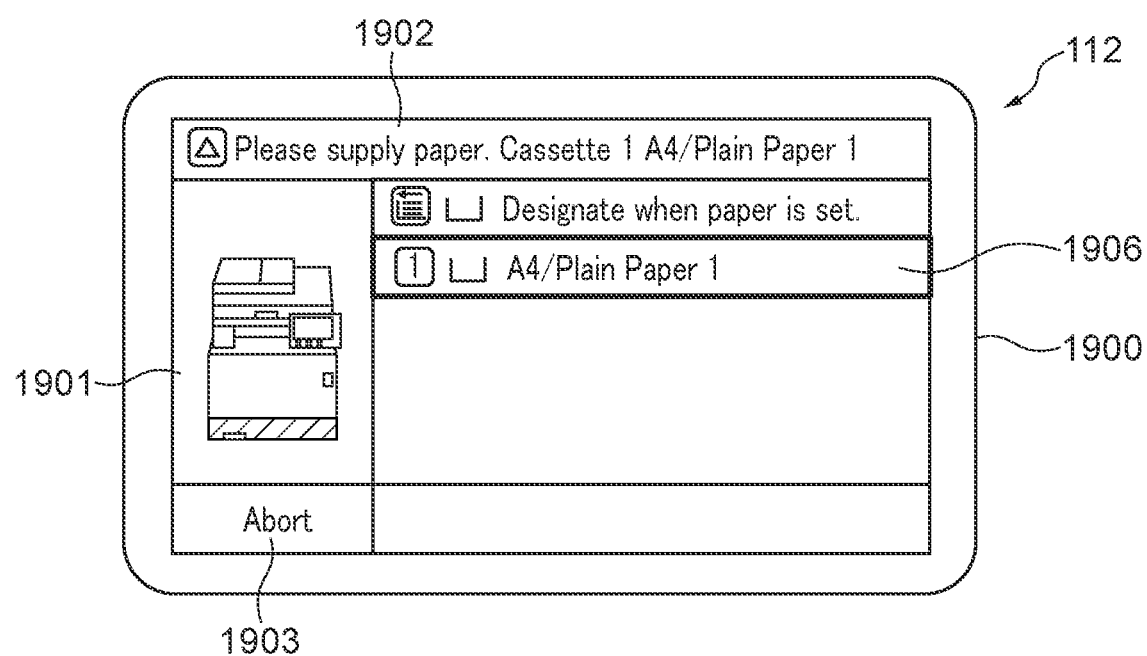
FIG. 19 is a view showing an example of an error screen displayed in a step S922 in FIG. 9.

When a paper shortage error or a paper jam error occurs during the execution of the print job input by the first extended application 241, the native program 210 instructs the operation unit 112 to display an error screen (a step S921). After that, when receiving the error screen display instruction from the native program 210, the operation unit 112 displays an error screen (step S922). For example, when the paper shortage error occurs, an error screen 1900 shown in FIG. 19 is displayed on the operation unit 112. A notice 1902 including a message that urges a user to supply paper and the size/type of shortage paper, a display area 1901 for an illustration of the image forming apparatus 401 in which the sheet cassette to which paper should be supplied is highlighted, an abort button 1903 for aborting the job are displayed on the error screen 1900. A button 1906 is used to display the detailed information about the sheet cassette 1. When the user selects the button 1906, a detailed information screen (not shown) is displayed. Moreover, a picture showing a paper residual amount of the sheet cassette 1 and the size/type of paper set to the sheet cassette 1 are displayed on the button 1906.

Moreover, when an error occurs in the first extended application 241 during the execution of this process, the first extended application 241 executes an error handling mentioned later by referring to FIG. 16 in a step S923.

Figure 10:
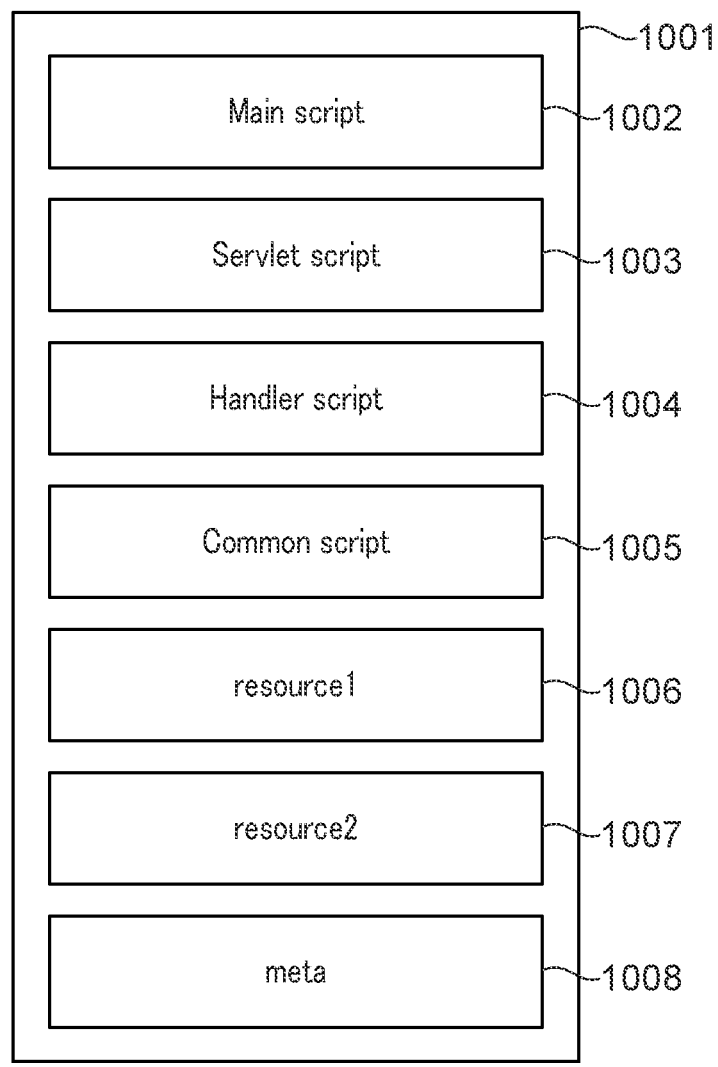
FIG. 10 is a view showing an application configuration in the embodiment of the present invention.

FIG. 10 shows a configuration of installation data (application data 1001) of the extended application 240.

The application data 1001 is data (archive) that gathers all the data constituting the extended application 240. The application data 1001 is constituted by roughly dividing into three files.

The first file stores a main script 1002, servlet script 1003, handler script 1004, and common script 1005 that describes operations of the extended application 240 by a programming language. The second file stores resources 1006 and 1007 that store a display message, image data used by the extended application 240, etc. The third file stores meta data 1008 that declares an application name etc.

The main script 1002 describes an operation when the icon displayed on the operation unit 112 is pressed. The servlet script 1003 executes the process of the servlet service 304. The handler script 1004 performs the timer process. The main script 1002, servlet script 1003, and handler script 1004 use the common script 1005 in common.

When executing the extended application 240, only a required script among the main script 1002, servlet script 1003, handler script 1004, and common script 1005 is loaded to the RAM 102. Accordingly, wasteful memory consumption can be reduced.

Figure 11:
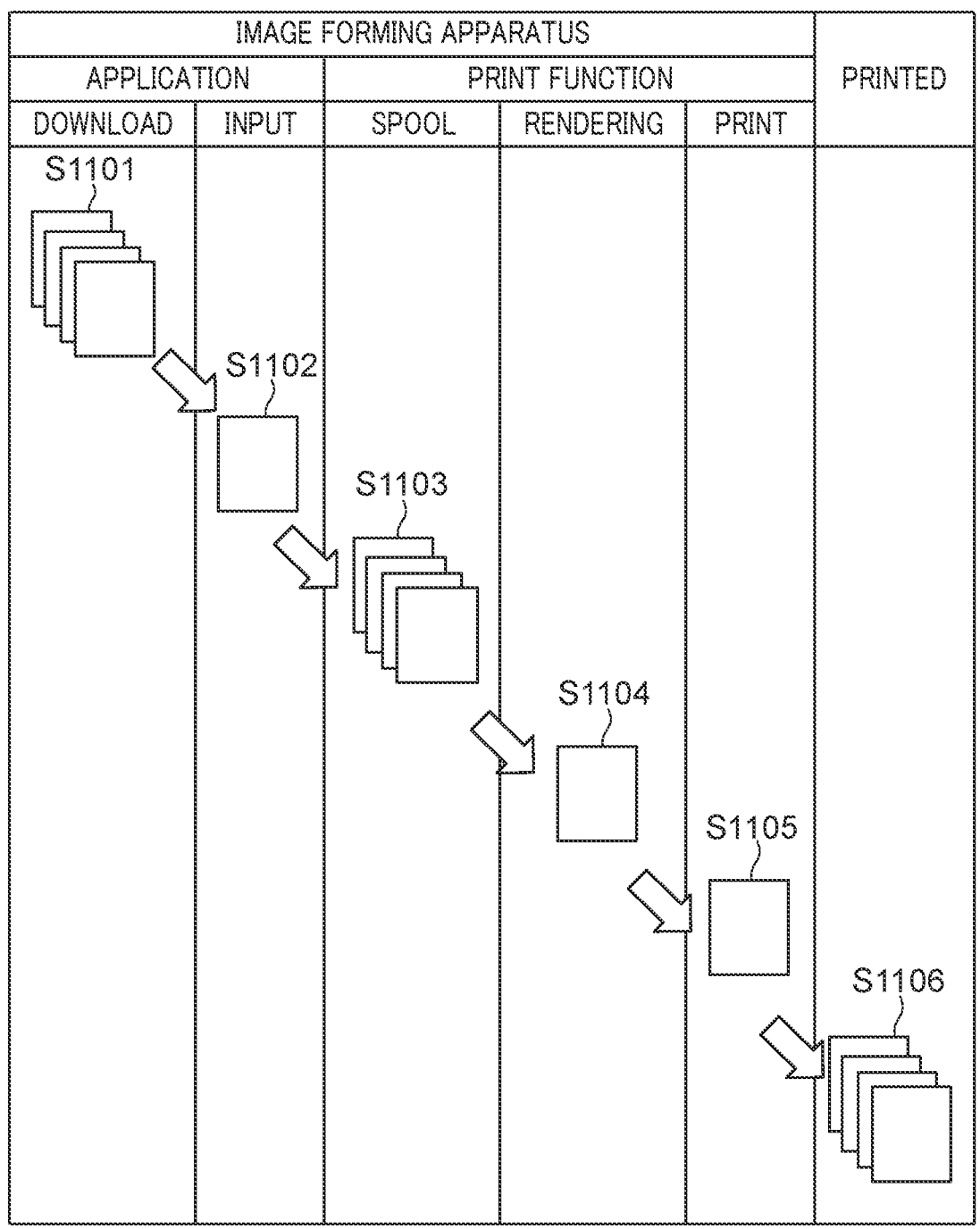
FIG. 11 is a view showing a processing state of print data in the embodiment of the present invention.

FIG. 11 is a view showing a processing state of each page of a document (target file) that consists of a plurality of pages when the image forming apparatus 401 prints the document that is subjected to the schedule setting on the setting screen 601.

When the scheduled time and day of the week come, the first extended application 241 first downloads the document (target file) that consists of the plurality of pages stored in the place of the server 403 input in the place information entry field 606 (a step S1101).

The first extended application 241 inputs data into the print job successively during the download (a step S1102). The native program 210 first spools the input data (a step S1103), applies rendering to the spooled data (a step S1104), and then, prints the data that has been subjected to the rendering with the printer 195 (a step S1105).

The printer 195 outputs the printed data sequentially (step S1106).

Although the first extended application 241 is finished when all the data of the downloaded document that consists of the plurality of pages has been input into the print job, the spooling, rendering, and printing of each data are continued.

Figure 15:
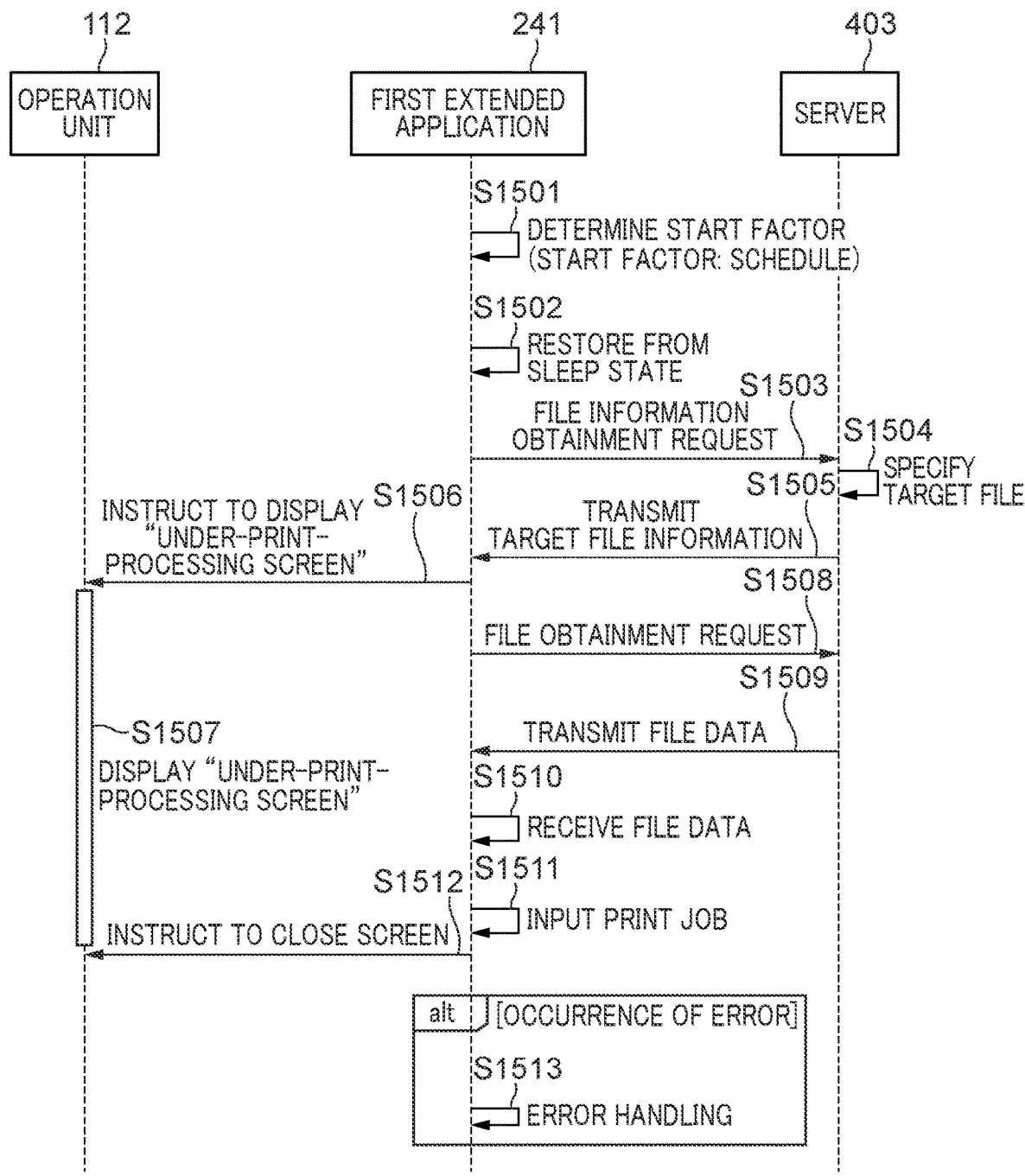
FIG. 15 is a sequence chart showing the form printing process executed on a schedule set on the setting screen of FIG. 6.

FIG. 15 is a sequence chart showing the form printing process executed on the schedule set in the fields 613 for setting of the print execution time in each day of the week on the setting screen 601 of FIG. 6.

It should be noted that processes by the operation unit 112 and first extended application 241 in the sequence of FIG. 15 are executed by the CPU 101 of the image forming apparatus 401 in accordance with the program stored in the storage unit 104. Moreover, the CPU (not shown) in the server 403 similarly executes the process in the server 403 in the sequence of FIG. 15 in accordance with a program stored in the storage unit (not shown) in the server 403. However, the execution subjects of the respective steps shall be the operation unit 112, first extended application 241, and server 403 in the following description.

The first extended application 241 is started by the application manager 302 at the time of the schedule set on the setting screen 601. After that, when the first extended application 241 receives a timer-process execution instruction from the application execution controller 305, this process starts.

In a step S1501, the first extended application 241 determines whether the start factor is the button press or the schedule. In this example, since the timer-process execution instruction is received from the application execution controller 305 at the start-up, the start factor is determined as the schedule, and the process proceeds to a step S1502. It should be noted that the case where the start factor is determined as the button press is mentioned above by referring to FIG. 9.

In the step S1502, when a power-supply management state of the image forming apparatus 401 is a sleep state, the first extended application 241 restores the image forming apparatus 401 from the sleep state, Processes of steps S1503, S1504, and S1505 are the same as that of the steps S903 through S905. Processes of steps S1506, S1507, S1508, S1509, S1510, S1511, and S1512 are the same as that of the steps S914 through S920. The step S1510 corresponds to the function of the file obtainment unit (file obtainment step) that obtains the file on the network. Moreover, the step S1511 corresponds to the function of the job input unit (job input step) that inputs a print job into the image forming apparatus 401.

When an error occurs in the first extended application 241 during the execution of this process, the first extended application 241 executes the error handling mentioned later by referring to FIG. 16 in a step S1513. Moreover, when the target file information is not transmitted from the server 403 until a predetermined time period elapses from the obtainment request of the step S1503, the error handling is executed.

Figure 16:
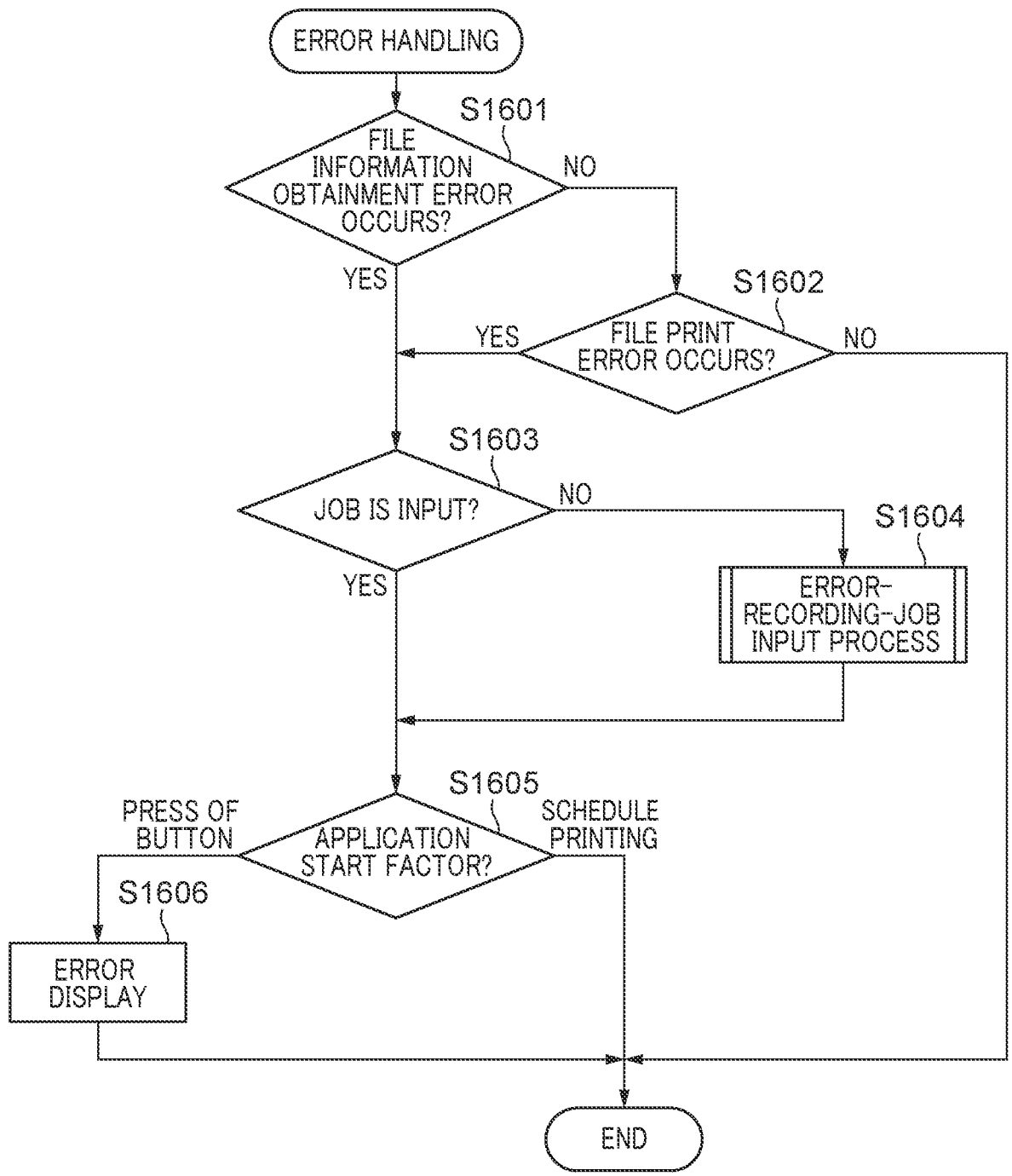
FIG. 16 is a flowchart showing an error handling according to the first embodiment executed in a step S923 in FIG. 9 and a step S1513 in FIG. 15.

FIG. 16 is a flowchart showing the error handling according to the first embodiment executed in the step S923 in FIG. 9 and the step S1513 in FIG. 15.

The CPU 101 executes this process in accordance with a program stored in the storage unit 104. However, the execution subject of the respective steps shall be the first extended application 241 in the following description.

In a step S1601, the first extended application 241 determines whether an obtainment error (file information obtainment error) of the file data of the target file from the server 403 occurs. When the file information obtainment error occurs as a result of the determination, the process proceeds to a step S1603. When the file information obtainment error does not occur, the process proceeds to a step S1602. For example, when the target file information obtained from the server 403 shows the specification result showing that there is no target file, it is determined that the file information obtainment error occurs. Moreover, when the target file information cannot be obtained until a prescribed period elapses from the scheduled time set on the setting screen 601, it is determined that the file information obtainment error occurs.

In a step S1602, the first extended application 241 determines whether an error (a file print error) occurs during the printing based on the input print job. As a result of this determination, when the printing is completed without an error, the process is finished. In the meantime, when it is determined that the file print error occurs because the format of the contents of the target file does not support printing for example, the process proceeds to the step S1603.

In the step S1603, the first extended application 241 determines whether the print job is input in the step S919 or the step S1511. Although the print job is not input when the file information obtainment error occurs, the print job is input when the file print error occurs. As a result of the determination in the step S1603, when the print job is not input, the process proceeds to a step S1604. When the print job is input, the process proceeds to a step S1605.

In the step S1604, an error-recording-job input process for recording an error to the job history in the step S1604, and the process proceeds to the step S1605. The step S1604 corresponds to a function of an error recording job input unit (error recording job input step) that inputs the error recording job into the image forming apparatus 401. The details of the error-recording-job input process will be mentioned later by referring to FIG. 21.

In the step S1605, the start factor of the first extended application 241 is checked. When the first extended application 241 is started by the button press, the process proceeds to a step S1606. When the first extended application 241 is started by the schedule, the process is finished. Since the print job has been input in the case of the file print error, the file print error is recorded in the job history. Accordingly, the user can check the file print error at the time of the schedule printing by referring to the job history.

In the step S1606, the first extended application 241 transmits the error screen display instruction including error cause information to the operation unit 112 and finishes this process. When receiving this error screen display instruction, the operation unit 112 displays an error screen 1700 of FIG. 17.

Figure 17:
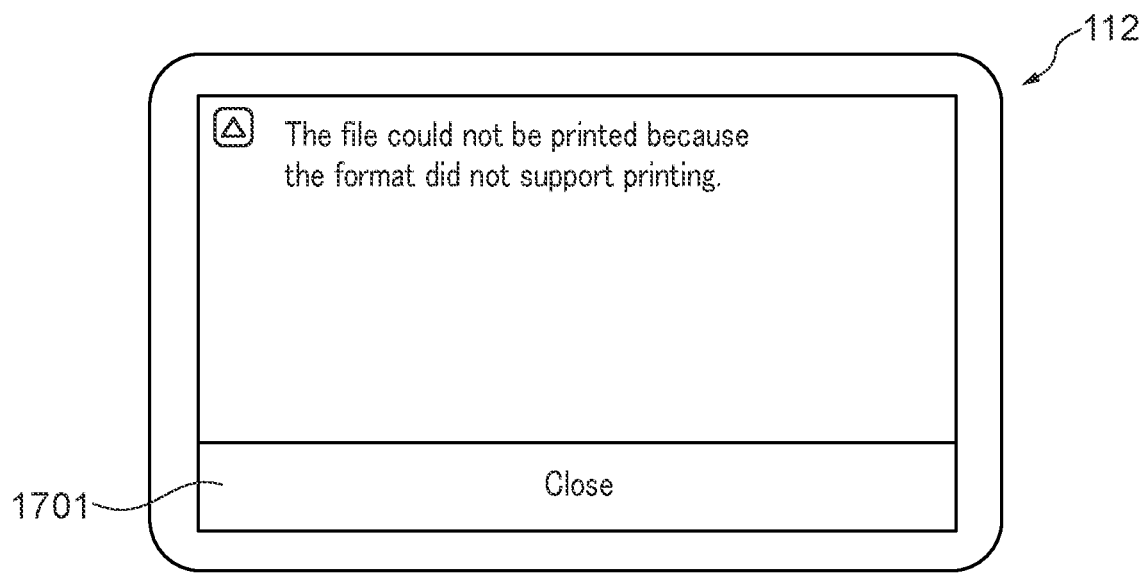
FIG. 17 is a view that exemplifies an error screen displayed in a step S1606 in FIG. 16.

As exemplified in FIG. 17, a message showing failure of printing of a file and a close button 1701 are displayed on the error screen 1700. It should be noted that the error screen 1700 of FIG. 17 is an example. When the file information obtainment error occurs, a message showing such a state is displayed.

As described above, the first extended application 241 determines the start factor at the start-up in this embodiment. When the start factor is the schedule, it is estimated that a user is not near the image forming apparatus 401. In such a case, the file print error that occurs after inputting a print job and the file information obtainment error that occurs before inputting a print job are recorded into the job history. In the meantime, when the start factor is the button press, it is estimated that a user is near the image forming apparatus 401. In such a case, the error screen is displayed on the operation unit 112 at the timing of detection of the file print error or the file information obtainment error in addition to recording the error as the job history. Thereby, a user can be certainly notified of the error that occurs in the form printing process.

Figure 18:
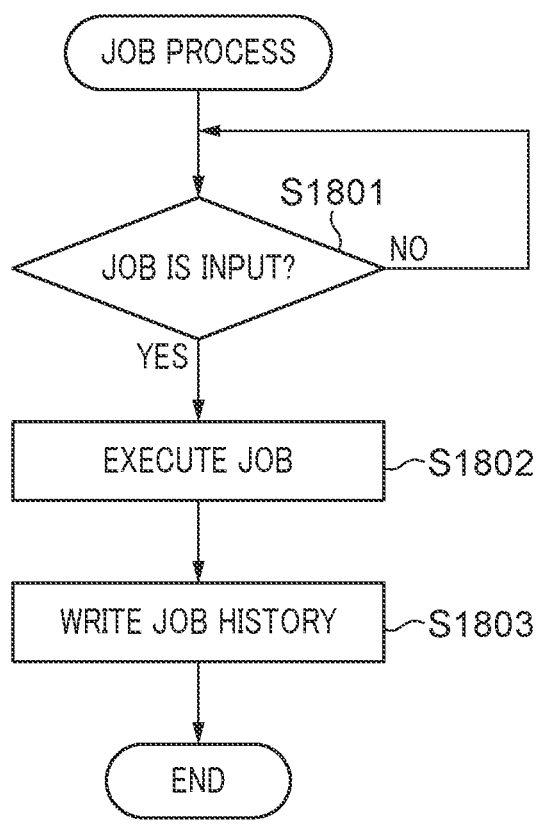
FIG. 18 is a flowchart showing a print job execution process executed by the image forming apparatus.

FIG. 18 is a flowchart showing a print job execution process executed by the image forming apparatus 401. The CPU 101 executes this process in accordance with a program stored in the storage unit 104.

In a step S1801, the CPU 101 waits for input of a print job. When the print job is input, the process proceeds to a step S1802 and the CPU 101 executes the print job. Specifically, the CPU 101 controls the printer 195 to print the print data included in the print job.

Next, the CPU 101 writes the information about the executed print job into the job history as a record in a step S1803 and finishes this process.

The user can check the records of all the print jobs executed by the image forming apparatus 401 and written into the job history by the process of FIG. 18 by displaying a job-history confirmation screen 2000 on the operation unit 112.

FIG. 20 is a view showing the job-history confirmation screen 2000 displayed on the operation unit 112. The job-history confirmation screen 2000 has an area 2001 in which the records of the job history are displayed as a list. Each record written into the job history includes four fields of a job number, an execution result, the number of pages, and a title.

The area 2001 displays a record 2002 of the error recording job input by the error-recording-job input process of the step S1604 in addition to the records of the print jobs written in the job history by the process of FIG. 18.

Figure 21:
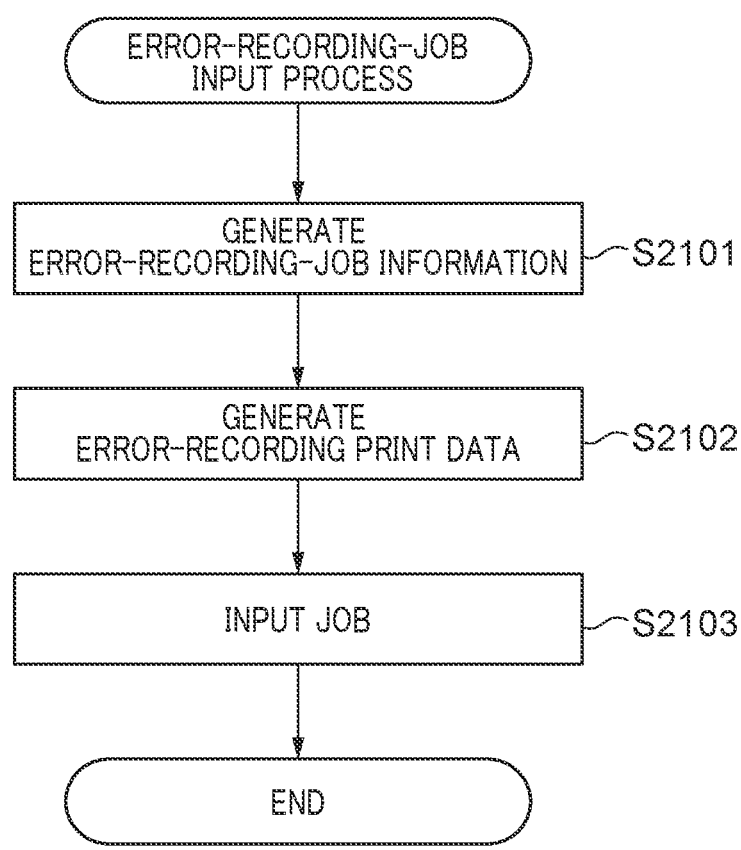
FIG. 21 is a flowchart showing an error-recording-job input process executed in a step S1604 in FIG. 16.

FIG. 21 is a flowchart showing an error-recording-job input process executed in the step S1604 in FIG. 16. The CPU 101 executes this process in accordance with a program stored in the storage unit 104.

The CPU 101 first generates error-recording-job information for recording an error of the first extended application 241 in a step S2101. It should be noted that the error-recording-job information includes "NG" as the execution result, "0" as the number of pages, and "Form Printing: Topics: The file could not be read . . . " that are a content of the process executed by the first extended application 241, a button name, and an error content as the title. The record 2002 in FIG. 20 is displayed on the basis of the error-recording-job information. Although the button name is displayed as the identification information about the first extended application 241 in this embodiment, link information to the setting screen of FIG. 6 may be displayed as the identification information. The record 2002 in FIG. 20 may include a part of the information shown in FIG. 21.

Next, the CPU 101 generates error-recording print data in a step S2102. When a regular print job is input, print data included in the print job is printed. In the meantime, since this process aims to record an error into the job history, it is unnecessary to print actually. Accordingly, actual printing consumes resources, such as paper, wastefully. For that reason, the error-recording print data is generated so as not to operate the printer 195 in this step in order to avoid wasteful consumption of the resources. It should be noted that the error-recording print data may be empty data.

Next, the CPU 101 generates an error recording job including the error-recording-job information and error-recording print data and inputs the job in a step S2103, and finishes this process.

According to the error-recording-job input process of FIG. 21, when the file information obtainment error occurs in the first extended application 241, the error recording job is generated in place of the print job and is input. This enables to record the file information obtainment error into the job history. Moreover, the consumption of the resources due to the input of the error recording job is also avoidable.

Next, the second embodiment of the present invention will be described. In the first embodiment, when the file information obtainment error occurs during the execution of the form printing, the user is notified that the error occurs in the form printing process by inputting the error recording job. As compared with this, in the second embodiment, when the file information obtainment error occurs during the execution of the form printing, the user is notified that the file information obtainment error occurs in the form printing process by printing an error report.

In the second embodiment, the hardware units, software modules, and processes that are identical to that of the first embodiment are indicated by the same reference numerals and the duplicate descriptions are omitted.

Figure 22:
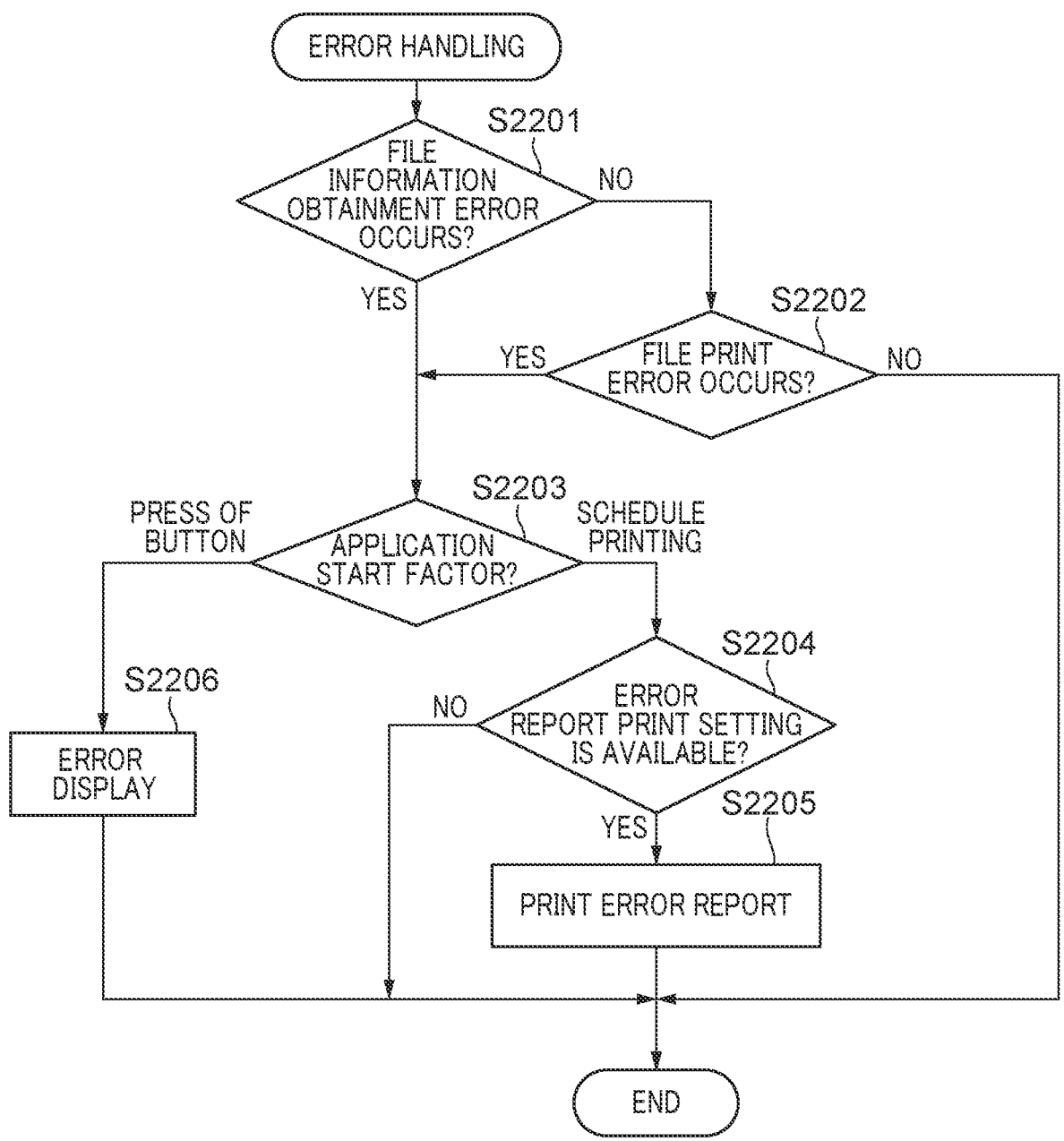
FIG. 22 is a flowchart showing an error handling in an image forming apparatus according to a second embodiment executed in the step S923 in FIG. 9 and the step S1513 in FIG. 15.

FIG. 22 is a flowchart showing an error handling in an image forming apparatus according to the second embodiment executed in the step S923 in FIG. 9 and the step S1513 in FIG. 15.

The CPU 101 executes this process in accordance with a program stored in the storage unit 104. However, the execution subject of the respective steps shall be the first extended application 241 in the following description.

The first extended application 241 determines whether the file information obtainment error occurs in a step S2201 as with the step S1601. When the file information obtainment error occurs as a result of the determination, the process proceeds to a step S2203. When the file information obtainment error does not occur, the process proceeds to a step S2202.

The first extended application 241 determines whether the file print error occurs in the step S2202 as with the step S1602. As a result of this determination, when the printing is completed without an error, the process is finished. In the meantime, when the file print error occurs, the process proceeds to the step S2203.

In the step S2203, the first extended application 241 checks the start factor of the first extended application 241 as with the step S1605. When the first extended application 241 is started by the button press, the process proceeds to a step S2206. When the first extended application 241 is started by the schedule, the process proceeds to a step S2204.

In the step S2204, the first extended application 241 determines whether an error report print setting is available. The error report print setting is not a setting of the first extended application 241 but is a collective setting for extended applications of the image forming apparatus 401 that print error reports. The CPU 101 determines by checking the collective setting. As a result of the determination, when the error report print setting is not available (i.e., the error report is not printed), this process is finished. In the meantime, when the error report print setting is available (i.e., the error report is printed), the process proceeds to a step S2205.

The first extended application 241 (an error report printing unit) generates the error report showing the contents of the error and instructs the printer 195 to print the error report in the step S2205, and finishes this process. The step S2205 corresponds to an error report printing step that generates and prints a first error report.

In the step S2206, the first extended application 241 transmits the error screen display instruction including error cause information to the operation unit 112 as with the step S1606 and finishes this process. When receiving this error screen display instruction, the operation unit 112 displays the error screen 1700.

According to the process of FIG. 22, the user is not needed to set whether to print the error report for every extended application 240 that prints the error report. Moreover, at the time of the form printing, the detection result of the error (file information obtainment error) that occurs before inputting the print job and the detection result of the error (file print error) that occurs after inputting the print job are summarized as one error report. Thereby, the user easily grasps the error that occurs during the form printing.

Figure 23:
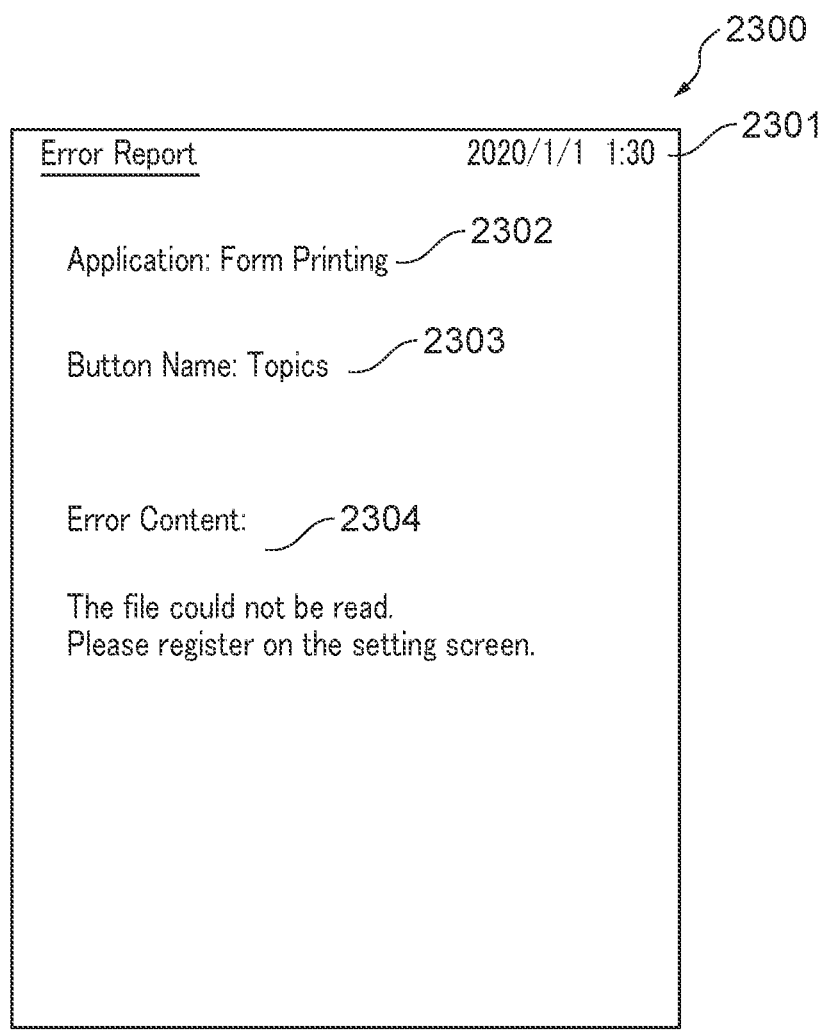
FIG. 23 is a view showing an error report of the application in the image forming apparatus according to the second embodiment.

FIG. 23 is a view showing an example of the error report printed in the step S2205 in FIG. 22. Hereinafter, an error report 2300 about an error that occurs during the form printing executed by the first extended application 241 will be described.

As shown in FIG. 23, the error report 2300 includes scheduled printing time (date and time) 2301, a process content 2302 executed by the first extended application 241, a button name 2303 of the first extended application 241, and an error content 2304. Although the button name is displayed as the identification information about the first extended application 241 in this embodiment, link information to the setting screen of FIG. 6 may be displayed as the identification information. Moreover, the error report 2300 may include a part of the information shown in FIG. 23.

According to the error handling according to the second embodiment, the error report is printed at the time of the form printing. Accordingly, even when the form printing is performed while the user is not near the image forming apparatus 401, the user is able to confirm the error immediately by checking the error report.

Moreover, when a print error occurs during schedule printing of a plurality of files, an error report is not printed at the time of the occurrence of the error but is printed after finishing the print of all the files. Thereby, the user easily perceives the error because the error report is distinguishable from other print results.

Next, a third embodiment of the present invention will be described. In the first embodiment, when the file information obtainment error occurs during the execution of the form printing, the user is notified that the error occurs in the form printing process by inputting the error recording job. As compared with this, in the third embodiment, when the file information obtainment error occurs during the execution of the form printing, the extended application holds an error history, and the user is notified that the file information obtainment error occurs in the form printing process by displaying the error history the next time the extended application is executed.

In the third embodiment, the hardware units, software modules, and processes that are identical to that of the first embodiment are indicated by the same reference numerals and the duplicate descriptions are omitted.

Figure 24:
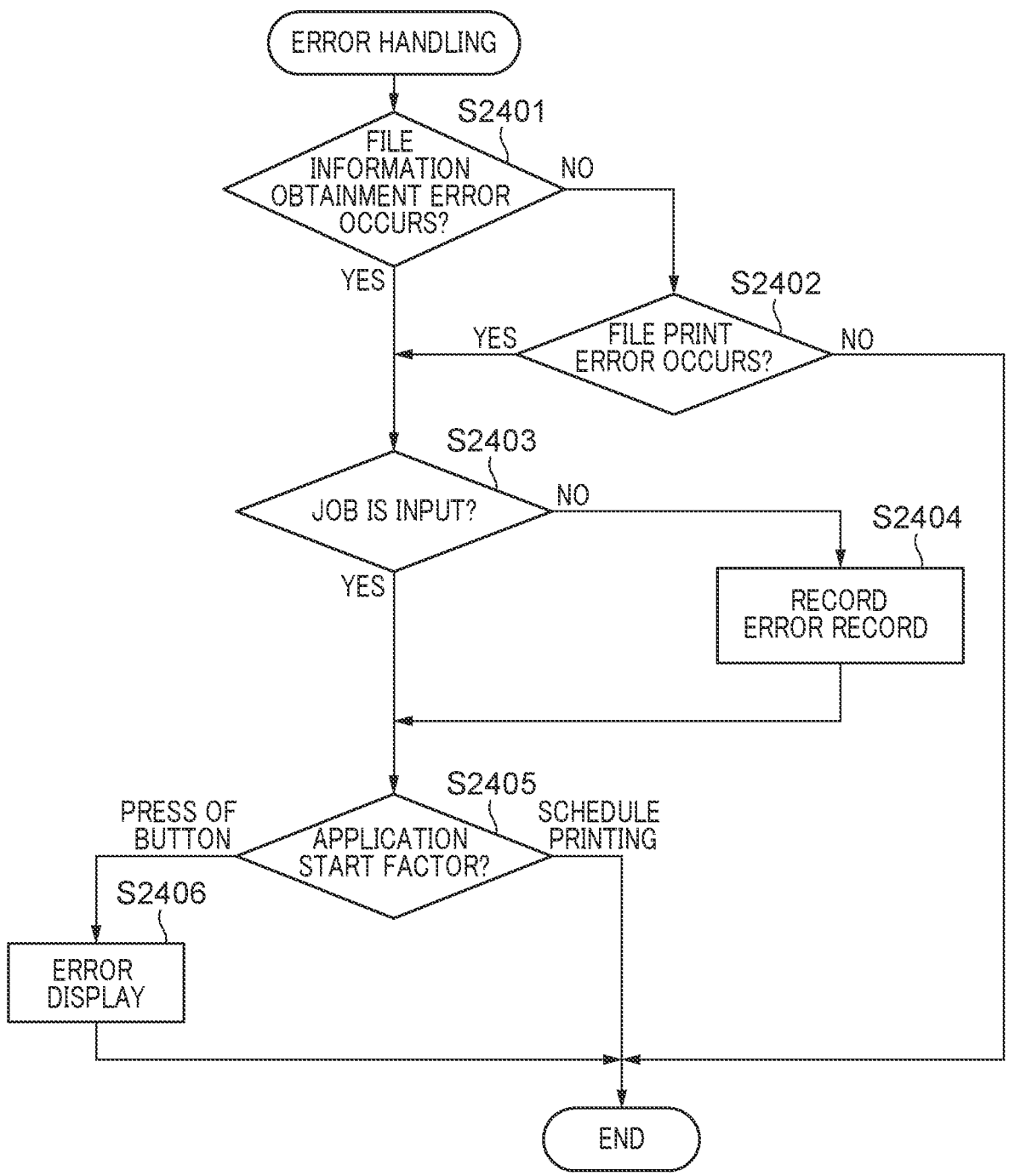
FIG. 24 is a flowchart showing an error handling in an image forming apparatus according to a third embodiment executed in the step S923 in FIG. 9 and the step S1513 in FIG. 15.

FIG. 24 is a flowchart showing an error handling in an image forming apparatus according to the third embodiment executed in the step S923 in FIG. 9 and the step S1513 in FIG. 15.

The CPU 101 executes this process in accordance with a program stored in the storage unit 104. However, the execution subject of the respective steps shall be the first extended application 241 in the following description. The processes of steps S2401, S2402, S2403, S2405, and S2406 are identical to the processes of the steps S1601, S1602, S1603, S1605, and S1606 in FIG. 16.

A process of a step S2404 is an error handling of a case where a job cannot be input. In this step, an error record is recorded into the error history stored in a storage unit that the first extended application 241 manages, and the process proceeds to the step S2405. The error record recorded in this step can be confirmed with an error history confirmation screen shown in FIG. 25. The error record recorded in this step includes at least three fields of a date/time of an error, a button name, and an error content.

Figure 25:
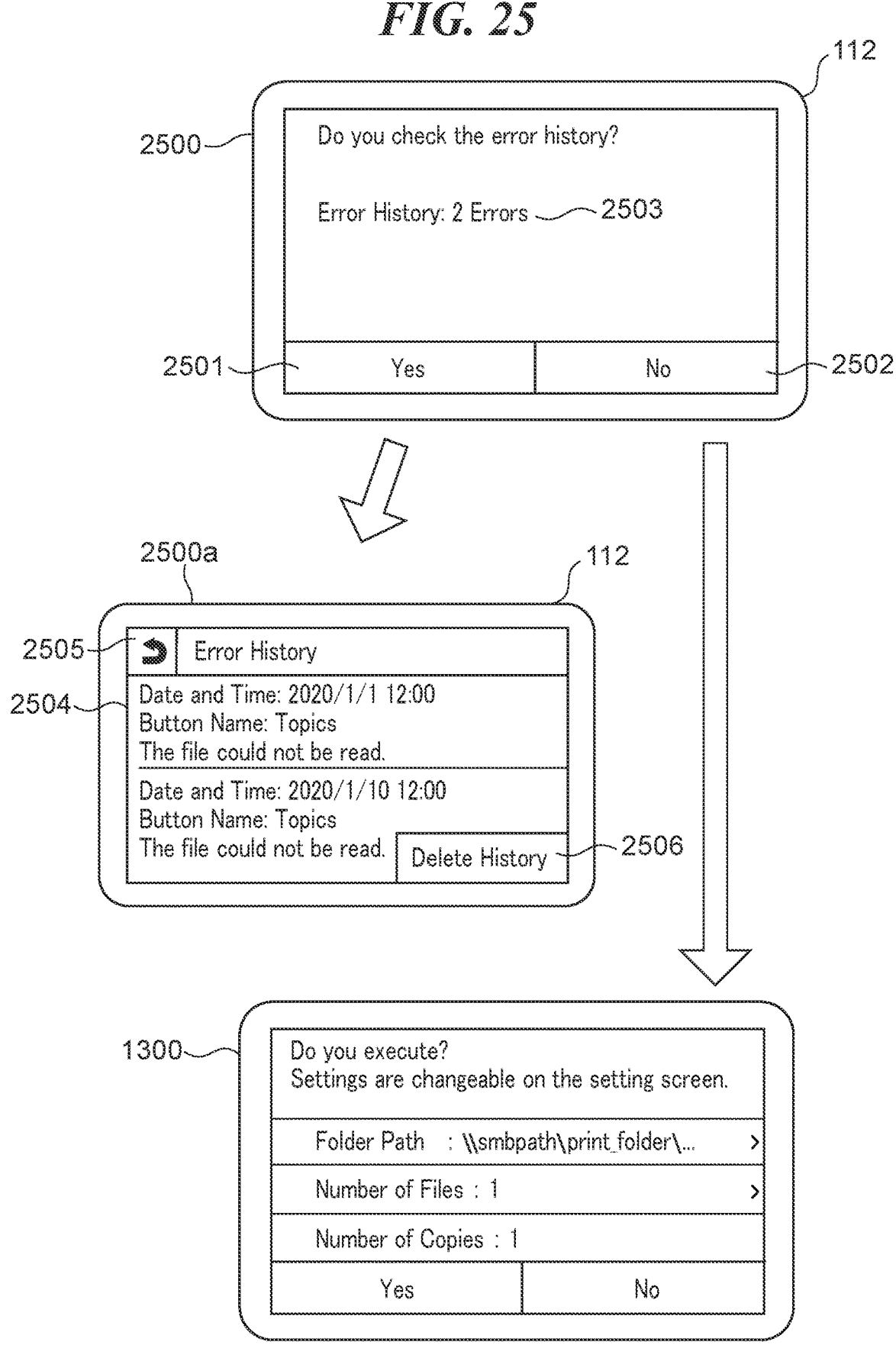
FIG. 25 is a view showing examples of screens displayed by an extended application when pressing a button that starts the extended application displayed on the operation unit of the image forming apparatus according to the third embodiment.

FIG. 25 is a view showing examples of screens displayed by the first extended application 241 when pressing a button that starts the first extended application displayed on the operation unit 112. The first extended application 241 displays a screen 2500 that checks whether to display the error history. This screen 2500 includes a "Yes" button 2501 and a "No" button 2502. Moreover, the screen 2500 includes a display area 2503 for the number of the errors that the first extended application 241 records into the error history.

When the "Yes" button 2501 is pressed, a screen 2500a that displays the error history. When the "No" button 2502 is pressed, the setting confirmation screen 1300 shown in FIG. 13 is displayed. The screen 2500a includes a display area 2504 for the error history that the first extended application 241 records, a back button 2505 for returning to the screen 2500, and a history deletion button 2506 for deleting the error history that the first extended application 241 records. Thereby, the user is able to confirm the error history.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-103089, filed Jun. 15, 2020, which is hereby incorporated by reference herein in its entirety.

What is claimed is:

1. An image forming apparatus comprising:
   a printer;
   a memory device storing one or more programs; and
   a processing device configured by the one or more programs stored by the memory device at least to:
   cause the printer to print image data included in a print job, wherein the image data is stored on a network;
   record a print result as a job history; and
   execute an application based on occurrence of a start factor, the processing device configured by the application at least to:
   specify the image data on the network using path information;
   obtain the image data via the network to input the print job into the image forming apparatus in a case where there exists the image data specified by the path information;
   input an error recording job, which indicates that the print job has not been input, into the image forming apparatus in a case where an error, which indicates that there exists no image data specified by the path information, occurs before the print job is input into the image forming apparatus and occurs in execution of the application; and
   display, without inputting the error recording job into the image forming apparatus, an error screen that indicates a cause of an error in a case where an error occurs after the print job is input into the image forming apparatus and occurs in execution of the application.

2. The image forming apparatus according to claim 1, wherein job information included in the error recording job includes at least one of a content of a process that is executed by the application in which the error occurs, identification information about the application, and an error content.

3. The image forming apparatus according to claim 1, wherein error-recording data included in the error recording job prohibits a print operation.

4. The image forming apparatus according to claim 3, wherein the error-recording data are empty data.

5. The image forming apparatus according to claim 1, wherein if the start factor indicates that a scheduled printing time arrives, the error screen is not displayed.

6. The image forming apparatus according to claim 1, wherein the path information is set by a user in advance.

7. A control method for an image forming apparatus that causes a printer to print image data that is included in a print job and stored on a network, records a print result as a job history, and executes an application based on occurrence of a start factor, the control method comprising:
   specifying, with the application, the image data on the network using path information;
   obtaining the image data via the network with the application to input the print job into the image forming apparatus with the application in a case where there exists the image data specified by the path information;
   inputting an error recording job, which indicates that the print job has not been input, into the image forming apparatus with the application in a case where an error, which indicates that there exists no image data specified by the path information, occurs before the print job is input into the image forming apparatus and occurs in execution of the application; and
   displaying, without inputting the error recording job into the image forming apparatus, an error screen that indicates a cause of an error in a case where an error occurs after the print job is input into the image forming apparatus and occurs in execution of the application.

8. A non-transitory computer-readable storage medium storing a control program causing a computer to execute a control method for an image forming apparatus that causes a printer to print image data that is included in a print job and stored on a network, records a print result as a job history, and executes an application based on occurrence of a start factor, the control method comprising:
   specifying, with the application, the image data on the network using path information;
   obtaining the image data via the network with the application to input the print job into the image forming apparatus with the application in a case where there exists the image data specified by the path information;
   inputting an error recording job, which indicates that the print job has not been input, into the image forming apparatus with the application in a case where an error, which indicates that there exists no image data specified by the path information, occurs before the print job is input into the image forming apparatus and occurs in execution of the application; and
   displaying, without inputting the error recording job into the image forming apparatus, an error screen that indicates a cause of an error in a case where an error occurs after the print job is input into the image forming apparatus and occurs in execution of the application.

* * * * *